(12) United States Patent
Antonacci et al.

(10) Patent No.: US 7,561,287 B1
(45) Date of Patent: Jul. 14, 2009

(54) SYSTEM AND METHOD FOR AUTOMATICALLY ROUTING AND STORING CODED INFORMATION AND DISPLAYING AN INTERACTION DEVICE

(75) Inventors: Robert Antonacci, Commack, NY (US); Manu Nath Capoor, New York, NY (US); Srinandan R. Kasi, New York, NY (US); Sandeep Laumas, Old Greenwich, CT (US); Nick Seth-Smith, Berkeley Heights, NJ (US); John C. Baird, New York, NY (US); Mahendra Srinivasan, New York, NY (US)

(73) Assignee: MMF Systems, Inc., New York, NY (US)

( * ) Notice: Subject to any disclaimer, the term of this patent is extended or adjusted under 35 U.S.C. 154(b) by 592 days.

(21) Appl. No.: 09/664,969

(22) Filed: Sep. 16, 2000

(51) Int. Cl.
*G06F 15/00* (2006.01)
(52) U.S. Cl. ............ 358/1.15; 358/1.16; 358/1.18; 358/453; 358/462; 358/470; 358/435
(58) Field of Classification Search ............ 358/403, 358/1.15, 1.14, 1.16, 1.18, 402, 434–436, 358/453, 462, 470; 235/462.01, 462.13, 235/462.15; 380/51, 241–243, 202, 239; 710/20
See application file for complete search history.

(56) References Cited

U.S. PATENT DOCUMENTS

| | | | |
|---|---|---|---|
| 5,027,421 A | 6/1991 | Kanno et al. | 382/47 |
| RE34,429 E | 11/1993 | Baran et al. | 379/100 |
| 5,608,786 A | 3/1997 | Gordon | 379/100 |
| 5,608,874 A * | 3/1997 | Ogawa et al. | 709/246 |
| 5,631,745 A | 5/1997 | Wong et al. | 358/434 |
| 5,675,507 A | 10/1997 | Bobo, II | 364/514 |
| 5,680,223 A | 10/1997 | Cooper et al. | 358/403 |
| 5,692,073 A | 11/1997 | Cass | 382/219 |
| 5,754,308 A | 5/1998 | Lopresti et al. | 358/403 |
| 5,793,972 A | 8/1998 | Shane | 395/200.49 |
| 5,823,948 A * | 10/1998 | Ross et al. | 600/300 |
| 5,838,458 A | 11/1998 | Tsai | 358/402 |

(Continued)

FOREIGN PATENT DOCUMENTS

DE 2282725 4/1995

(Continued)

OTHER PUBLICATIONS

Internet Telephony Round Up dated Feb. 2000.

(Continued)

*Primary Examiner*—Chan S Park
(74) *Attorney, Agent, or Firm*—Sofer & Haroun, LLP

(57) ABSTRACT

A system comprising a facsimile device configured to transmit a code-associated information material, an interactive user device, and a processor. Typically, the code-associated information material is a medical record to which a barcoded fax cover sheet is appended. The interactive device is preferably a computer terminal, wherein the processor is coupled to the interactive user device via the Internet. The processor is configured to receive from the facsimile device a transmission of the information material, and to display it to an authorized user upon a request from the authorized user. The information material may be displayed via Internet, or else may be faxed to an authorized user in response to a telephone call.

7 Claims, 22 Drawing Sheets

U.S. PATENT DOCUMENTS

| | | | | |
|---|---|---|---|---|
| 5,905,801 | A | * | 5/1999 | Serinken .................. 380/51 |
| 5,907,598 | A | | 5/1999 | Mandalia et al. ......... 379/100.1 |
| 5,917,615 | A | | 6/1999 | Reifman et al. ............ 358/468 |
| 5,953,392 | A | | 9/1999 | Rhie et al. ............... 379/88.13 |
| 5,969,324 | A | * | 10/1999 | Reber et al. ............ 235/462.13 |
| 5,982,863 | A | | 11/1999 | Smiley et al. .............. 379/112 |
| 5,987,100 | A | | 11/1999 | Fortman et al. ......... 379/88.14 |
| 6,021,186 | A | | 2/2000 | Suzuki et al. ......... 379/100.12 |
| 6,025,931 | A | | 2/2000 | Bloomfield ................ 358/402 |
| 6,028,679 | A | | 2/2000 | Murphy ..................... 358/407 |
| 6,073,106 | A | * | 6/2000 | Rozen et al. .................. 705/3 |
| 6,082,776 | A | * | 7/2000 | Feinberg ..................... 283/72 |
| 6,088,695 | A | * | 7/2000 | Kara ......................... 707/10 |
| 6,104,500 | A | | 8/2000 | Alam et al. ................ 358/1.15 |
| 6,171,112 | B1 | * | 1/2001 | Clark et al. ................. 434/322 |
| 6,188,766 | B1 | | 2/2001 | Kocher ....................... 380/246 |
| 6,192,112 | B1 | * | 2/2001 | Rapaport et al. ......... 379/88.22 |
| 6,240,445 | B1 | | 5/2001 | Kumar et al. ............... 709/206 |
| 6,256,115 | B1 | | 7/2001 | Adler et al. ................. 358/442 |
| 6,311,163 | B1 | * | 10/2001 | Sheehan et al. ................ 705/2 |
| 6,330,079 | B1 | | 12/2001 | Dugan et al. ................ 358/403 |
| 6,348,970 | B1 | | 2/2002 | Marx ........................ 358/1.15 |
| 6,356,356 | B1 | | 3/2002 | Miller, Jr. et al. .......... 358/1.15 |
| 6,373,602 | B1 | | 4/2002 | Kohler et al. ............... 358/538 |
| 6,389,121 | B1 | | 5/2002 | Terao ...................... 379/100.8 |
| 6,424,996 | B1 | * | 7/2002 | Killcommons et al. ...... 709/206 |
| 6,426,806 | B2 | * | 7/2002 | Melen ........................ 358/468 |
| 6,463,417 | B1 | * | 10/2002 | Schoenberg .................. 705/2 |
| 6,651,060 | B1 | * | 11/2003 | Harper et al. ................... 707/9 |
| 6,665,086 | B2 | * | 12/2003 | Hull et al. ................... 358/1.15 |
| 6,742,161 | B1 | * | 5/2004 | James et al. ................. 715/500 |
| 6,779,178 | B1 | * | 8/2004 | Lloyd et al. ................. 717/174 |
| 2002/0018236 | A1 | | 2/2002 | Musk et al. ................ 358/1.15 |
| 2002/0018248 | A1 | | 2/2002 | Ohhashi et al. ............. 358/474 |
| 2002/0036792 | A1 | | 3/2002 | Murphy ..................... 358/1.15 |
| 2003/0035141 | A1 | | 2/2003 | Ilda ............................ 358/1.15 |
| 2003/0169449 | A1 | | 9/2003 | Ilda ............................ 358/1.15 |

FOREIGN PATENT DOCUMENTS

| | | | |
|---|---|---|---|
| EP | 0388093 | | 3/1990 |
| EP | 0388093 | | 9/1990 |
| EP | 0561606 | | 3/1993 |
| EP | 1017225 | | 5/2000 |
| GB | 2244625 | | 4/1991 |
| GB | 2244625 A | * | 12/1991 |
| GB | 2282725 | | 10/1993 |

OTHER PUBLICATIONS

International Search Report dated Jun. 20, 2003.
The Topcall Solution—A Guide to Unified Communication System.
Internet Telephony dated Feb. 2000.
iRIMS 2001 by Open Text Corporation, 2001 Summary Report.
Loris-File Nexus Digital Filing System.
European Supplementary Search Report Jun. 2, 2005.
Annex to European Search Report.

* cited by examiner

Figure 4

| Identification Number 164 A | Coded Information 164 B |
|---|---|
| 1 2 3 4 5 | ■ ■ ■ ■ ■ ■ |
| 1 2 3 4 6 | ■ ■ ■ ■ ■ ■ |
| 1 2 3 4 7 | ■ ■ ■ ■ ■ ■ |
| 1 2 3 4 8 | ■ ■ ■ ■ ■ ■ |

Unique
Transmission
Record
164X

Figure 5(a)

| Identification Number 166 A | Coded Information 166 B |
| --- | --- |
| 1 2 3 4 5 | A B C D E F G |
| 1 2 3 4 6 | H I J K L M N |
| 1 2 3 4 7 | O P Q R S T U |
| 1 2 3 4 8 | V W X Y Z |

Unique Record 166X

Figure 5(b)

| Identification Number 170 A | Coded Information 170 B |
|---|---|
|  |  |
|  |  |
|  |  |
|  |  |

170

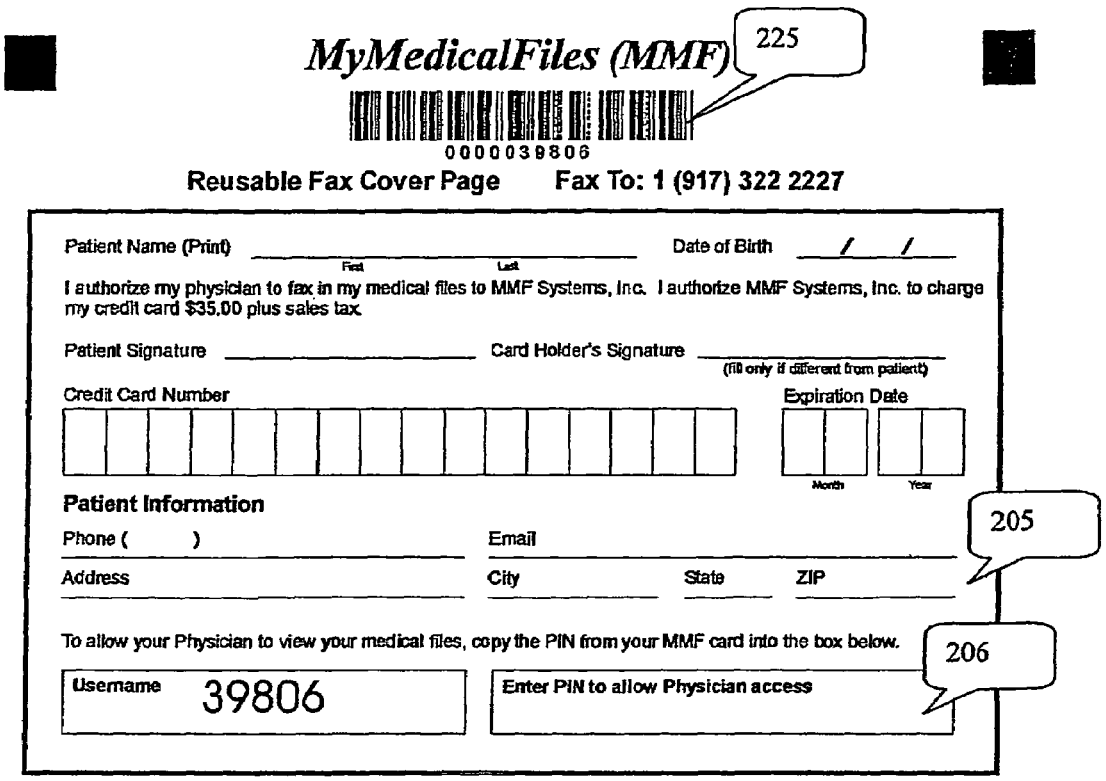
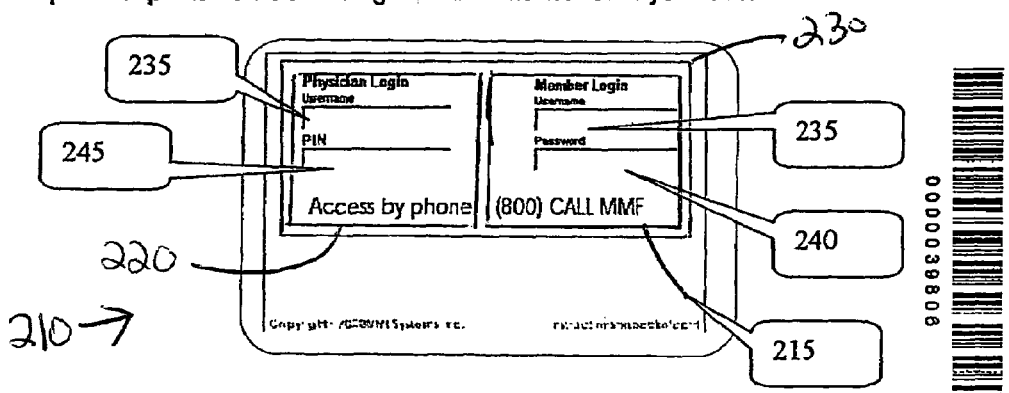
Figure 13

*MyMedicalFiles (MMF)*

0000000001

Summary Medical Record (SMR)

Patient Name _____
            Last          First

Date of Birth ___/___/___

Summary Medical Record Date

Active Medical Issues

Past Medical / Surgical History

(Please continue on additional paper as needed)

Allergies

Medications
Drug          Dosage / How Taken

Vaccinations / Preventive Care
DTP
MMR
Polio
Hib
Varicella
Hepatitis B
Influenza
Pneumococcus
Td Booster _____ TB _____
Rubella Titer _____ Measles Titer _____
Varicella Titer _____ Mumps Titer _____
Other

Instructions
Step 1: Minimize medical abbreviations to make this useful to patients
Step 2: Send to MMF using Reusable Patient Fax Cover Page

| No | Patient Name | User ID# | Access Code | Other |
|---|---|---|---|---|
| 1 | Jim Jones | 12345 | xyz | .... |
| 2 | Stan Smith | 67890 | abc | ..... |
| 3 | | | "Access Denied" | .... |
| 4 | | | | |
| 5 | | | | |

1905

1910

1915

1920

1925

1900

SYSTEM AND METHOD FOR AUTOMATICALLY ROUTING AND STORING CODED INFORMATION AND DISPLAYING AN INTERACTION DEVICE

BACKGROUND OF THE INVENTION

1. Field of the Invention

The present invention relates generally to a system and method for automatically routing and storing information materials and displaying it to authorized persons. More specifically, the present invention is directed toward a system and method to route and store a paper record using a facsimile transmission apparatus to a designated web site for retrieval and display to a user.

2. Description of the Prior Art

Today, the vast majority of medical records are paper-based (approximately 95% according to a recent study) and dispersed among various healthcare facilities and physicians. A single patient may, over a lifetime, visit many different facilities or physicians. The paper medical records associated with these patient visits typically remain scattered between the facilities which the patient sees over his or her lifetime. In addition, patients may not be provided with copies of their medical records by their physician unless the patient specifically requests the physician to do so. Thus, when a patient visits a physician, the patient rarely can provide the physician with his or her full and accurate medical history. In approximately one-third of consultations, patients do not have any prior medical documentation.

In order to facilitate the communication of medical records between different physicians, in some facilities electronic medical record systems are currently employed. Typically, each of these types of system requires the physician to input data into a computer or handheld device, such as the patient's identification information, the date, and a record of the physician's diagnosis and treatment. Inputted data is then stored and may be reviewed by an interested person, such as the patient, the physician, or by an authorized subsequent physician when required.

However, these electronic medical record systems are generally ineffective because the entry of medical data into the system by the physician is time-consuming. The time which a physician requires in order to enter the data could instead be used to see additional patients, an option which most physicians prefer. In addition, these electronic medical record systems can be complex, requiring additional time to train physicians in their use and to troubleshoot them when not operating properly. Reducing the amount of time that is spent with a patient is also not an option for most physicians, since, due to the low margins imposed by managed healthcare systems, the average amount of time that a physician spends with a patient is already a paltry 8.5 minutes. In addition, these electronic medical records systems require a very high capital expenditure.

Furthermore, these electronic medical record systems are typically closed. For instance, the electronic medical records system of a hospital may not be made available to physicians that are not associated with the hospital. Thus, electronic records which are entered and kept by the hospital are rendered useless if the patient visits another hospital, as is very often the case. Also, 80% of the 650,000 physicians that practice in the United States do so in small medical groups of 3-10 physicians. These small businesses do not have the resources to establish electronic medical record systems of their own.

Many of the currently used electronic medical record systems emphasize the security features of their systems. These electronic medical record systems typically employ encryption technology in order to secure patient's records. Despite the use of these encryption technologies, however, there is still no method for securing patient records feasibly and inexpensively.

Thus, an electronic medical record system is required which is simple for a physician to use, and which provides access by authorized persons to a patient's medical records.

SUMMARY OF INVENTION

The present invention, according to one embodiment thereof, is directed towards a system and method which enables a person to route information materials using a standard facsimile apparatus to a designated website for access by authorized persons. In a preferred embodiment, the present invention comprises a system and method for routing medical records to a database using a standard facsimile transmission apparatus. All of the records relating to a patient are associated with a unique barcode or other identification code at the time of facsimile transmission. The medical records are stored in the database based upon the unique identification code or barcode.

In a preferred embodiment, the system comprises a processor which is coupled to the database. The processor is also coupled via the Internet to a plurality of interactive user devices, such as computer terminals or the like. The processor comprises a web server configured to maintain an addressable web site that provides interfaces for the users. The processor is also coupled to a facsimile device via a public-switched telephone network (hereinafter referred to as a "PSTN").

Furthermore, the processor comprises a barcode generator, which is configured to generate a barcode corresponding to, for instance, an identification number which is assigned by the system to a user, the type of information material which is transmitted, the medical practitioner which is transmitting the information material, etc. A barcode reader is employed to read barcodes from the information material received via facsimile.

According to one embodiment of the invention, the processor further comprises an encryption module. In this embodiment, information materials, such as a patient's medical records, are received by the encryption module and are encrypted into encrypted information materials, which are then stored in the storage means. The processor is configured to store all of a patient's encrypted information materials in a storage location of the storage means corresponding to the patient. In response to authentication data received from a user, the processor decrypts and displays the information materials to the user on a designated web page. In a preferred embodiment, the system stores the encrypted information materials in a format which does not require third party display software to display the decrypted images, such as GIF files.

The method of the present invention, in accordance with one embodiment thereof, comprises the step of assigning identification numbers and authentication data to a patient and storing the identification numbers and authentication data in a storage means. A barcode corresponding to the uniquely assigned identification number is generated and is supplied to a user. According to various embodiments of the invention, the barcode may also correspond to the user's password or access code, to the type of form being transmitted, etc., as will be discussed in greater detail below.

Subsequently, the barcode, or a cover sheet having the barcode printed thereon, is appended to a patient's information material (e.g.—a medical report) in order to associate the barcode information with the patient's information material. The code-associated information material is then faxed to a predetermined number which is connected to a processor of the system. Advantageously, the processor reads the barcode and encrypts the information material to create an encrypted information material. The processor then stores the encrypted information material as a record in a location of the storage means which corresponds to the patient's identification number.

A user of the system (such as a patient or a medical practitioner) can retrieve the patient's information material by accessing, for example, an addressable website associated with the processor and storage means. The system is configured such that the user can access the encrypted information material by entering the patient's identification number and the corresponding authentication data. The image is decrypted and the original information image is then displayed on an interactive device.

In a preferred embodiment, the method of the present invention employs preprinted fax cover sheets which are distributed to medical practitioners by the system operator. The preprinted registration forms have separable regions, such as a first region having a barcode printed thereon for use as a facsimile coverpage. A second region may comprise a space for a patient to include credit card information for billing purposes. A third region may comprise detachable or peel-off cards, such as a patient card and a doctor card. Both cards include a user ID number or name and an access code, such as a PIN code, permitting records that are faxed into the system for storage to be accessed via Internet, telephone or fax. Advantageously, the patient card also includes a password, which enables the patient to delete specific records that have been stored, to edit or delete data corresponding to the records, or to restrict the access of specific medical practitioners to the medical records.

BRIEF DESCRIPTION OF DRAWINGS

Representative embodiments of the present invention will be described with reference to the following figures:

FIG. 4 is an illustration of an encrypted information data module, in accordance with one embodiment of the invention.

FIGS. 5(a) and (b) are illustrations of patient and doctor authentication data modules respectively, in accordance with one embodiment of the invention.

FIG. 13 is an illustration of a re-usable fax cover sheet, in accordance with one embodiment of the invention.

FIG. 17 is an illustration of a summary medical record form, in accordance with one embodiment of the invention.

FIG. 18 is an interface that may be employed by a medical practitioner in order to keep track of patients, in accordance with one embodiment of the invention.

DETAILED DESCRIPTION OF THE DRAWINGS

Reference is now made to the accompanying figures for the purpose of describing, in detail, the preferred embodiments of the present invention. The figures and accompanying detailed description are provided as examples of the invention and are not intended to limit the scope of the claims appended hereto. While the present invention is described in connection with the storage and display of medical records, it is recognized that the present invention may be employed to code, store and display other types of records also. In addition, it is noted that the designation of persons that use the system as a "patient" and a "medical practitioner" is merely illustrative, and is not intended to limit the scope of this invention to only these types of users.

Figure 1:
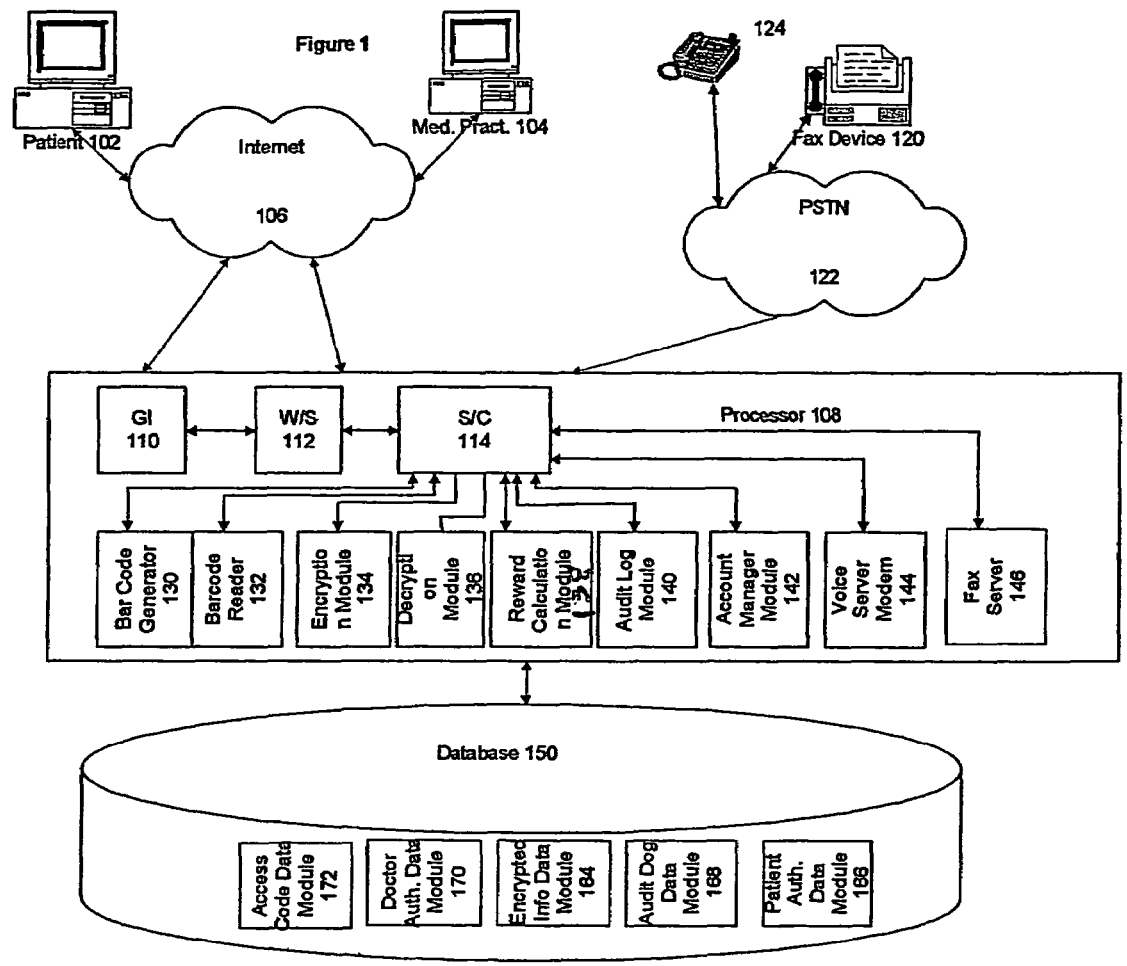
FIG. 1 is an illustration of the system components of the present invention, in accordance with one embodiment of the invention.

FIG. 1 is a block diagram that illustrates the salient features of the present invention, in accordance with a preferred embodiment. FIG. 1 shows processor 108 coupled via Internet 106 to a plurality of interactive user devices, such as computer terminals or the like. In this case, processor 108 is coupled via Internet 106 to a patient terminal 102 and to a medical practitioner terminal 104.

Processor 108 is preferably an electronic data processing system, which controls various operations of the system as will be described hereinafter. As is well known in the art, processor 108 may comprise CPUs, micro-controllers, microprocessors, embedded controllers, and application specific integrated circuits.

In the embodiment shown, processor 108 comprises web server 112 which is configured to maintain an addressable web site. Processor 108 also comprises viewer display interface module 110 that provides an interface for users of the computer terminals to communicate with processor 108, as will be described further below. System controller 114 is coupled to web server 112, and controls the operation of processor 108. System controller 114 advantageously employs program code such as machine readable object code. Such code is compiled from human readable source code created using programming languages such as C, C++, Visual Basic, Java, and other such languages well known in the art. It is noted that, while certain features of processor 108 are described as being independent (such as independent of storage means 150, which is explained further below), processor 108 may have integrated functionality. Methods of incorporating storage and program code into processors is well known in the art and is not further described here.

Processor 108 is also coupled to facsimile transmission device 120 via public-switched telephone network 122 (hereinafter referred to as a "PSTN"). As will be explained in greater detail below, an information material, such as a medical report, is advantageously transmitted via facsimile transmission device 120 to processor 108.

Processor 108 also comprises modules which perform various operations (although it is noted that these modules need not be discrete components but may instead be any combination of components, or software, which provide the desired functionality described below). For instance, according to one embodiment of the invention, processor 108 comprises a barcode generator module 130, which is configured to generate unique barcodes. The unique barcode which is generated by barcode generator 130 corresponds to an identification number of a specific patient. As will be described in further detail below, barcode generator 130 may also generate barcodes that correspond to additional information, such as a type of form being transmitted, the user's password or access code, etc.

Figure 3:
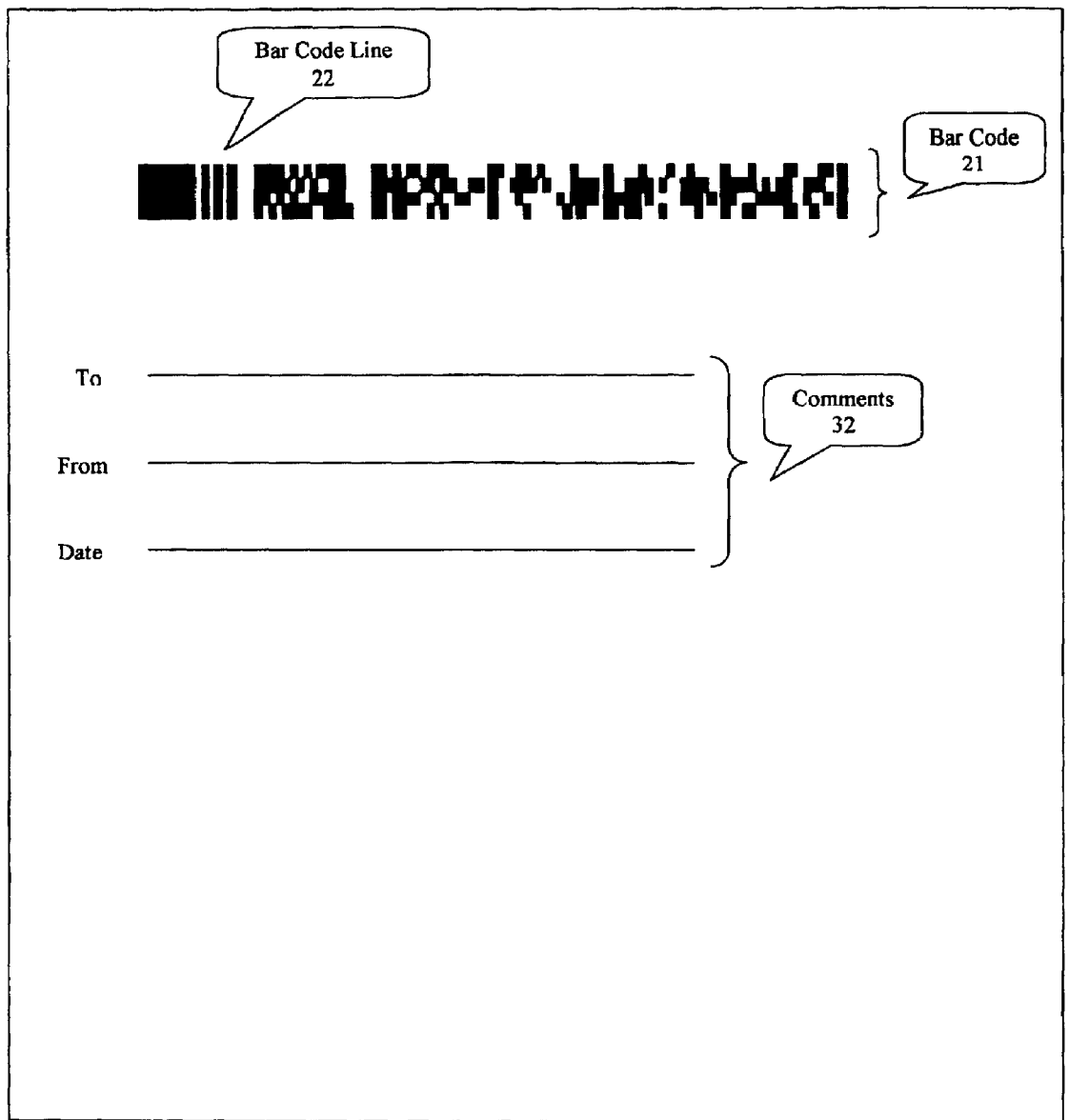
FIG. 3 is an illustration of a fax cover page with a printed barcode placed at the top of the cover page, in accordance with one embodiment of the invention.

When the barcode is appended to a medical report, such as by employing a barcode header cover sheet (as shown in FIG. 3 and as described below), the medical report is thereby associated with the barcode, so as to create a code-associated information material. However, it is noted that, while the following description sets forth a code-associated information material which is in the form of a barcoded paper record, the present invention also contemplates that other methods of coding may be employed. For instance, coding methods can include hand printed characters, two-dimensional barcodes, machine readable graphical representations, and all other types of markings.

Barcode reader module 132 is employed by processor 108 to read barcodes. Thus, when a code-associated information material, such as a patient's medical records, is received by processor 108 via facsimile, barcode reader module 132 reads the barcode and determines, for instance, the patient that the material corresponds to. Preferably, the barcode comprises a patient's identification number, and barcode reader 132 is configured to read the barcode and obtain the patient's identification number. The information material is then automatically routed to storage means 150 (which is explained further below) to a record location corresponding to the patient.

Processor 108 further comprises encryption module 134. Once an information material is associated with a particular patient by barcode reader module 132, the information material is next processed, according to one embodiment of the invention, by encryption module 134 of processor 108. Encryption module 134 encrypts the coded information materials into encrypted information materials, thus insuring that the materials can not be accessed by unauthorized persons. In another embodiment of the invention, the system is configured such that encryption module 134 instead encrypts patient and physician authentication data, such as PIN codes and the like. In this embodiment, it is the authentication data (which is employed to provide access to users of the system to display the information materials as explained further below) which remains secure to unauthorized users.

Processor 108 further comprises decryption module 136. In response to a user inquiry, processor 108 employs decryption module 136 to decrypt stored information materials for display on the designated web page.

According to one embodiment of the invention, processor 108 may also comprise reimbursement amount calculation module 138. Reimbursement amount calculation module 138 is configured to determine a reimbursement amount for medical practitioners, or their staffs, for transmitting the code-associated information materials to the system for storage therein. As will be explained in greater detail below, reimbursement amount calculation module 138 may be configured to read the facsimile number from which a code-associated information material has been sent, and to determine a reimbursement amount based upon the total number of information materials that are transmitted from the facsimile number. In a preferred embodiment, the transmitted code-associated information material has barcode data corresponding to the medical practitioner that sends the document, and barcode data In another embodiment, as discussed below, reimbursement amount calculation module 138 is configured to determine a reimbursement amount amount based upon the number of times barcode reader module 132 reads an incoming barcode that corresponds to the particular medical practitioner. The process of the latter embodiment is described in the flowchart of FIG. 12, which is discussed more fully below.

Preferably, processor 108 also comprises audit log module 140, which is coupled to and controlled by system controller 114. Audit log module 140 is activated when a user, such as a physician, accesses the medical records of a patient. A record of each access, such as the date and time of the access and the identity of the person that accessed the record, is recorded in audit log data module 168 of storage means 150. The audit log feature of the present invention, which is described in greater detail below, enables the system operator to monitor and police the users that are viewing the medical records of a patient.

Processor 108 also comprises account manager module 142, which is coupled to and controlled by system controller 114. Account manager module 142 is activated by a medical practitioner upon entering a unique doctor-specific password, as will be discussed in greater detail below. Once activated, module 142 provides a work flow by which the physician can access and monitor the records of the patients which he or she has advised to register with the system.

Processor 108 also comprises voice server module 144 and fax server module 146, both of which are coupled to and controlled by system controller 114. Voice server module 144 is configured to answer a telephone call received via PSTN 122 and to ask pre-recorded questions and to collect information in order to perform functions requested by a caller. Fax server module 146 is configured to generate and transmit a facsimile of a document (such as a record or a form) via PSTN 146 at a caller's request, as will be explained below.

Furthermore and as previously mentioned, processor 108 is coupled to storage means 150, which is configured to store data. Storage means 150 typically is a machine readable media. Such media, include, as is well known in the art, electronic, magnetic, and/or optical media such as a hard disk, optical disk, floppy disk, tape, random access memory, read only memory, and/or any combination thereof. While the following description refers to a storage device in the form of a centralized system, it is well known to those skilled in the art that a storage device can be a distributed system as well.

In the embodiment shown, storage means 150 comprises encrypted information data module 164, which stores medical records and the like which have been encrypted. Encrypted information data module 164 is shown and described in greater detail in connection with FIG. 4. Storage means 150 also comprises patient authentication data module 166, which stores password information corresponding to each patient's identification number. Patient authentication data module 166 is shown and described in greater detail in connection with FIG. 5(*a*).

Storage means 150 also comprises doctor authentication data module 170, which stores password information corresponding to each doctor. Doctor authentication data module 170 is shown and described in greater detail in connection with FIG. 5(*b*). Finally, storage means 150 also comprises access code data module 172, which stores access code information which a patient can give out to physicians or other persons so that the person can view the patient's records. Access code data module 172 is shown and described in greater detail in connection with FIG. 6. While the following description refers to specific individual databases, formats, records, fields, and indexing schemes, those skilled in the art will readily appreciate that such specifics are not critical to the present invention. Other databases, formats, records, fields, and indexing schemes may also be created and utilized by the service as desired.

Figure 2:
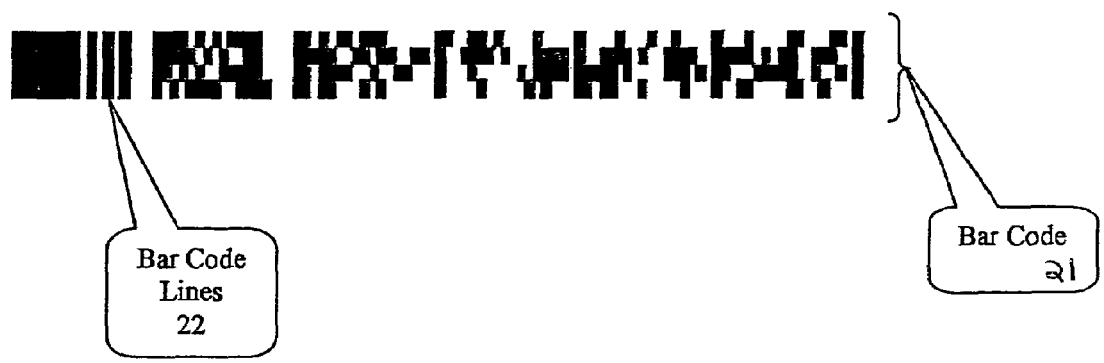
FIGS. 2(a) and (b) are illustrations of a printed barcode, in accordance with one embodiment of the invention.
Figure 2:
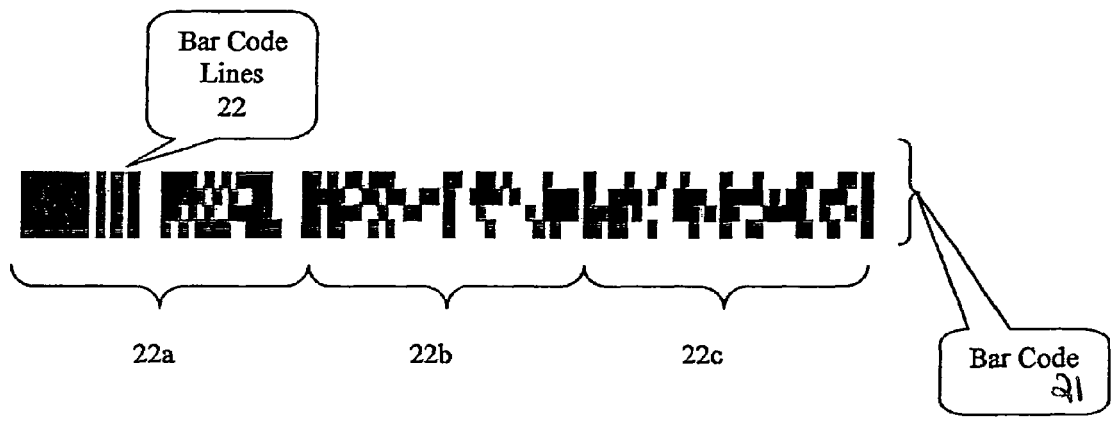

FIG. 2(*a*) is an illustration of printed barcode 21, such as may be generated by barcode generator 130. FIG. 2 depicts barcode 21 with unique barcode lines 22. The barcode lines 22 are generated by barcode generator module 130 to have varying thicknesses and are spaced at varying distances apart, thus enabling each unique barcode to correspond to a different patient in the system. As previously mentioned, the present invention also contemplates the use of other coding means (not just barcodes) that enable processor 108 to associate a faxed information material to a particular patient.

FIG. 2(*b*) is another illustration of barcode 21. According to this embodiment, barcode 21 comprises various barcode regions, each of which corresponds to different information which is employed by processor 108. For instance, according to one embodiment, barcode region 22*a* corresponds to the type of record or form which is being transmitted. Two types of forms which are employed are the preprinted fax cover sheet, which is shown and explained in connection with FIG. 13, and the summary medical record form, which is shown and explained in connection with FIG. 17. Thus, when barcode 21 is received and is read by barcode reader module 132, barcode region 22*a* identifies the type of form which is being received.

Furthermore, barcode region 22*b* corresponds to the identification number of a patient. When barcode 21 is received and is read by barcode reader module 132, barcode region 22*b* identifies the patient to whom the form corresponds. Barcode region 22*c*, on the other hand, may correspond to authentication data, such as an access code, of a patient. When barcode 21 is received and is read by barcode reader module 132, barcode region 22*c* provides an authentication data which corresponds to the patient.

FIG. 3 is an illustration of a code-associated information header sheet 31. FIG. 3 depicts code-associated information header sheet 31 comprising barcode 21. In addition, according to one embodiment, code-associated information header sheet 31 further comprises comments 32. Comments 32 may be any type of information which may indicate the nature of the facsimile to a person viewing it. In one embodiment, the code-associated information header sheet 31 is a fax cover page bearing barcode 21.

FIG. 4 shows encrypted information data module 164 of storage means 150, according to one embodiment of the present invention. As previously mentioned, encrypted information data module 164 stores medical records which have been encrypted by encryption module 134. As shown in FIG. 4, each record in encrypted information data module 164 contains encrypted data corresponding to a patient's identification number. Specifically, field 164*a* stores each patient's unique identification number, while field 164*b* stores the encrypted information material data (e.g.—the encrypted medical records) corresponding to the patient's identification number.

FIG. 5(*a*) shows patient authentication data module 166 of storage means 150, according to one embodiment of the present invention. As previously mentioned, patient authentication data module 166 stores password information corresponding to each patient. In one embodiment and as will be further explained below, a temporary password is issued to new patients that register with the system, and processor 108 is configured to prompt the new patient, upon first logging onto the system, to change the password.

Specifically, FIG. 5(*a*) shows patient authentication data module 166 having patient identification number field 166*a* and patient authentication data field 166*b*. Patient identification number field 166*a* stores each patient's identification number (e.g.—the same patient identification number that is stored in field 164*a* of encrypted information data module 164 of FIG. 4). Patient authentication data field 166*b* stores, according to one embodiment, first the temporary password that is issued to the patient upon registration, and then the password which the patient selects upon logging onto the system.

Of course, other records and fields in this data module (or any other data module described herein) may be used as desired. While the following description refers to authentication data in the form of a character string or password, it is well known to those skilled in the art that authentication data can also include pass-phrases, and that trusted third party authentication tools can be used to generate, maintain and process authentication data. In addition, although the authentication data is described in the following as being centrally stored in a database, it is well known to those skilled in the art that authentication data can be non-resident or distributed, or that the identification and authentication data which is described herein as being stored in separate data modules may instead be stored in databases of varying complexity.

FIG. 5(*b*) shows doctor authentication data module 170 of storage means 150, according to one embodiment of the present invention. As previously mentioned, doctor authentication data module 170 stores password information corresponding to each doctor that registers with the system. The doctor's password information enables the doctor, according to one embodiment, to employ account manager module 142 for the purpose of monitoring and accessing the medical records of patients which they have advised to register with the system. As in the patient case, a temporary password may be issued to new doctors that register with the system, and processor 108 is configured to prompt the doctor to select their own password.

Specifically, FIG. 5(b) shows doctor authentication data module 170 having doctor identification number field 170a and doctor authentication data field 170b. Doctor identification number field 170a stores each doctor's identification number. Doctor authentication data field 170b stores, according to one embodiment, first the temporary password that is issued to the doctor upon registration, and then the password which the doctor selects.

Figure 6:
FIG. 6 is an illustration of an access code data module, in accordance with one embodiment of the invention.

FIG. 6 shows access code data module 172 of storage means 150, according to one embodiment of the present invention. Access code data module 172 stores access code information which a patient can give out to physicians or other persons so that the person can view the patient's records. As shown in the figure, access code data module 172 comprises patient identification number field 172a, which stores the patient's identification numbers, and access code data field 172b, which stores an access code corresponding to each patient. As previously mentioned, each patient is issued an access code upon registering in the system. The access code provides read-only access to the patient's medical records. Thus, the patient may provide his or her access code to a physician in an emergency room so that the physician can view the patient's medical records. Advantageously, the patient can change his or her access code at any time, so as to prevent a doctor that previously treated the patient from accessing the patient's records in the future.

Figure 7:
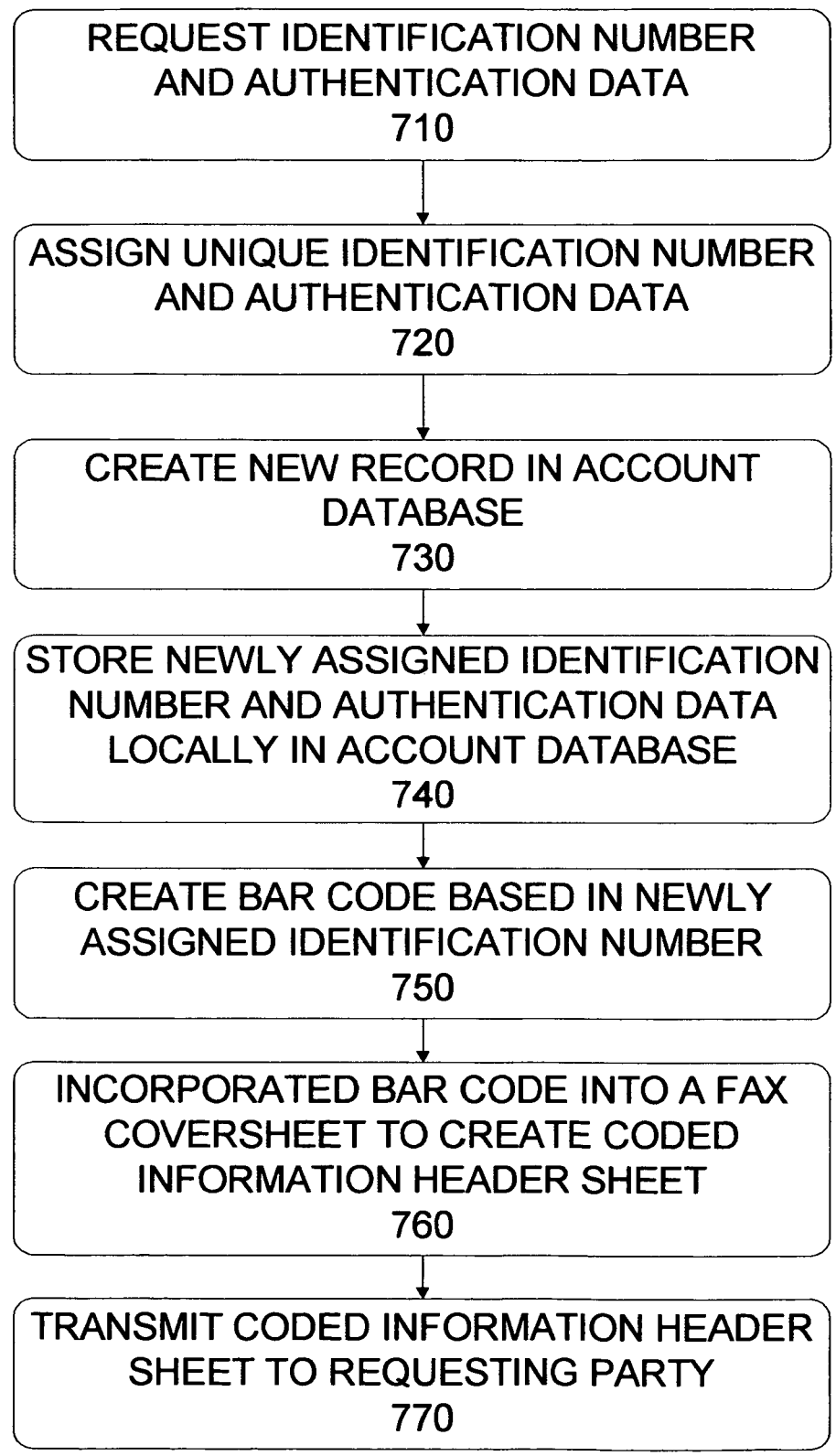
FIG. 7 is a flowchart describing the process by which a person can register for and receive a unique identification number and authentication data, in accordance with one embodiment of the invention.

FIG. 7 is a flowchart that illustrates, according to one embodiment of the invention, the steps which are performed in order for a patient to register for and receive a unique identification number and authentication data, thus enabling the automatic routing and storage of data. At step 710, the patient contacts the system operator and requests to register in the system. In one embodiment, this step is accomplished by the patient contacting the system operator directly. Of course, other methods may also be employed, for example, by the Internet, electronic mail, telephone, fax, in-person or any other means deemed permissible by the system operator. As will be explained in greater detail below, the present invention also contemplates a system in which preprinted forms are employed to register a new patient, thereby eliminating the need for a new patient to contact the system operator.

At step 720, the system operator receives the patient's request and assigns to the patient a unique identification number, authentication data and an access code, the purpose of which have been previously described. In one embodiment, the authentication data is a password selectable by the patient. In this manner, the password operates as a private key in a private/public key encryption scheme, while the barcode operates as the public key. According to this scheme, the public key is employed to encrypt the information material while the private key is employed to decrypt the message. Thus, only persons that have the patient's private key (i.e.—the authentication data) may view and display the medical records once stored in the system. In this embodiment, barcode 21 includes two types of information, i.e.—the patient identification number and the public key code employed to decode the information material.

Next, at step 730, processor 108 accesses patient authentication data module 166 in storage means 150 and generates a new record location. Specifically, a new record location is generated in order to store the patient's identification number in patient identification number field 166a and the patient's password in patient authentication data field 166b. Methods of accessing a database by computer and creating a new record in the database are well known in the art and therefore are not further described here.

Next, at step 740, processor 108 saves the identification number and authentication data in patient identification number field 166a and patient authentication data field 166b, respectively, of the new record location. Methods of saving information in a database are well known in the art and therefore are not further described here.

At step 750, barcode generator 130 of processor 108 creates a barcode 21 corresponding to the unique identification number of the patient. The barcode may be generated by having processor 108 print the barcode 21 on a printer with which it is in communication. The communication between processor 108 and the printer occurs over a connection which is well known in the art and is therefore not described further. Of course, barcode 21 may also be generated in electronic form or various other formats. Advantageously, and as previously mentioned, the printed barcode 21 has barcode lines 22 corresponding to the patient's unique identification number.

At step 760, barcode 21 is incorporated into a fax cover sheet to create a code-associated information header sheet 31. Methods of incorporating barcode 21 include electronically inserting barcode 21 into an electronic copy of the fax cover sheet, applying adhesive to the back of barcode 21 and pasting it onto the fax cover sheet, as well as any other means that can secure barcode 21 to the fax cover sheet. In addition to barcode 21, code-associated information header sheet 31 may have other comments 32 describing specific information regarding a particular fax transmission, such as the names of the parties sending and receiving the transmission.

Then, at step 770, code-associated information header sheet 31 is provided to the patient. In one embodiment, step 770 is accomplished by the system operator by transmitting header sheet 31 to the patient directly. Of course, other methods of transmission may also be employed. For example, code-associated information header sheet 31 may be transmitted to the patient by the Internet, electronic mail, fax, or any other means acceptable to both the system operator and the patient.

Figure 8:
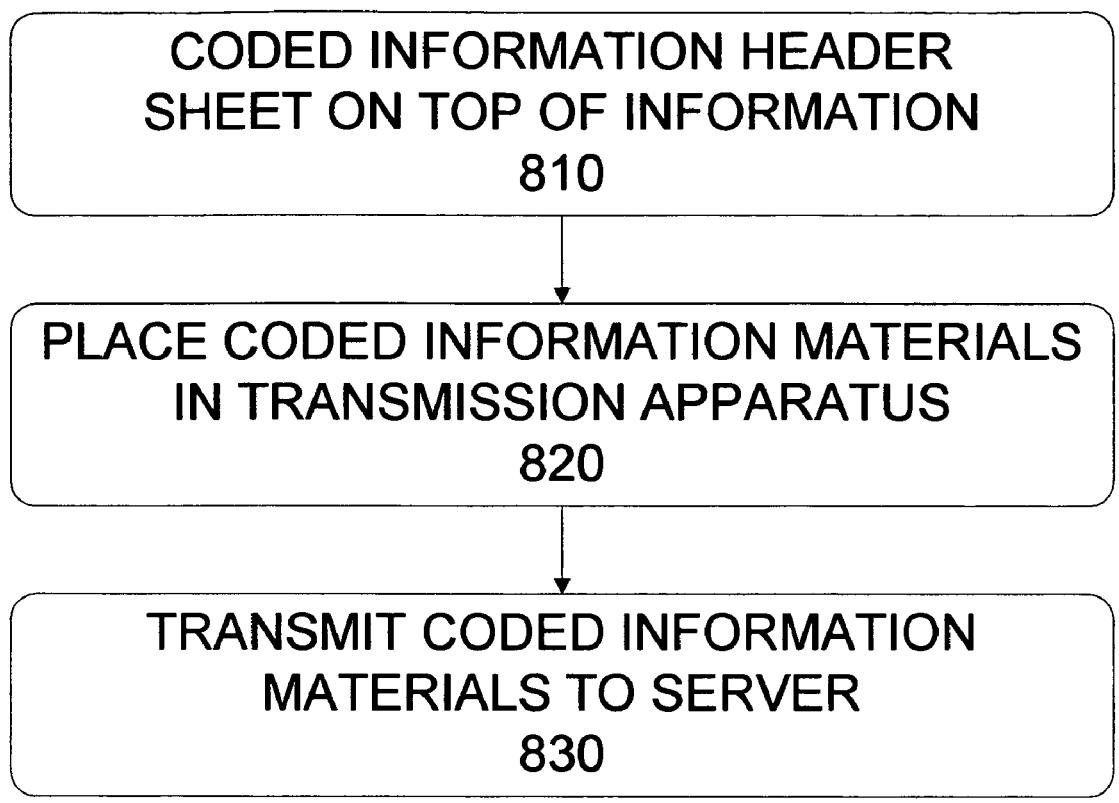
FIG. 8 is a flowchart describing the process by which a facsimile transmission apparatus processes and transmits paper records, in accordance with one embodiment of the invention.

FIG. 8 is a flowchart that illustrates the steps that are performed, according to one embodiment of the present invention, in order for a facsimile transmission apparatus to process and transmit information materials, such as paper medical records, to processor 108. As is evident, this step may be performed by the patient, by a medical practitioner that has provided medical services to the patient, or by any other person that handles the patient's medical records. At step 810, the code-associated information header sheet 31 is placed on top of the information materials 10 to create coded information materials 12. Thus, for example, a person may place a code-associated information header fax cover sheet with an appropriate barcode 21 on top of a summary medical report, which is shown and described in connection with FIG. 17.

Next, at step 820, code-associated information materials 12 are placed in an appropriate receptacle in fax transmission device 120. In one example, the transmission apparatus can be a standard G3 fax machine that is well known in the art and the receptacle can be the input tray of the fax machine.

At step 830, code-associated information materials 12 is transmitted to processor 108. Methods to transmit information from a transmission apparatus may vary according to the transmission apparatus being used, but are well known in the art and are not described here. By way of example, when a fax machine is used, code-associated information materials 12 can be transmitted by entering a destination telephone number on the numeric key pad of the fax machine. Thus, for example, the destination telephone number can be a toll free telephone number which processor 108 is in communication with.

Figure 9:
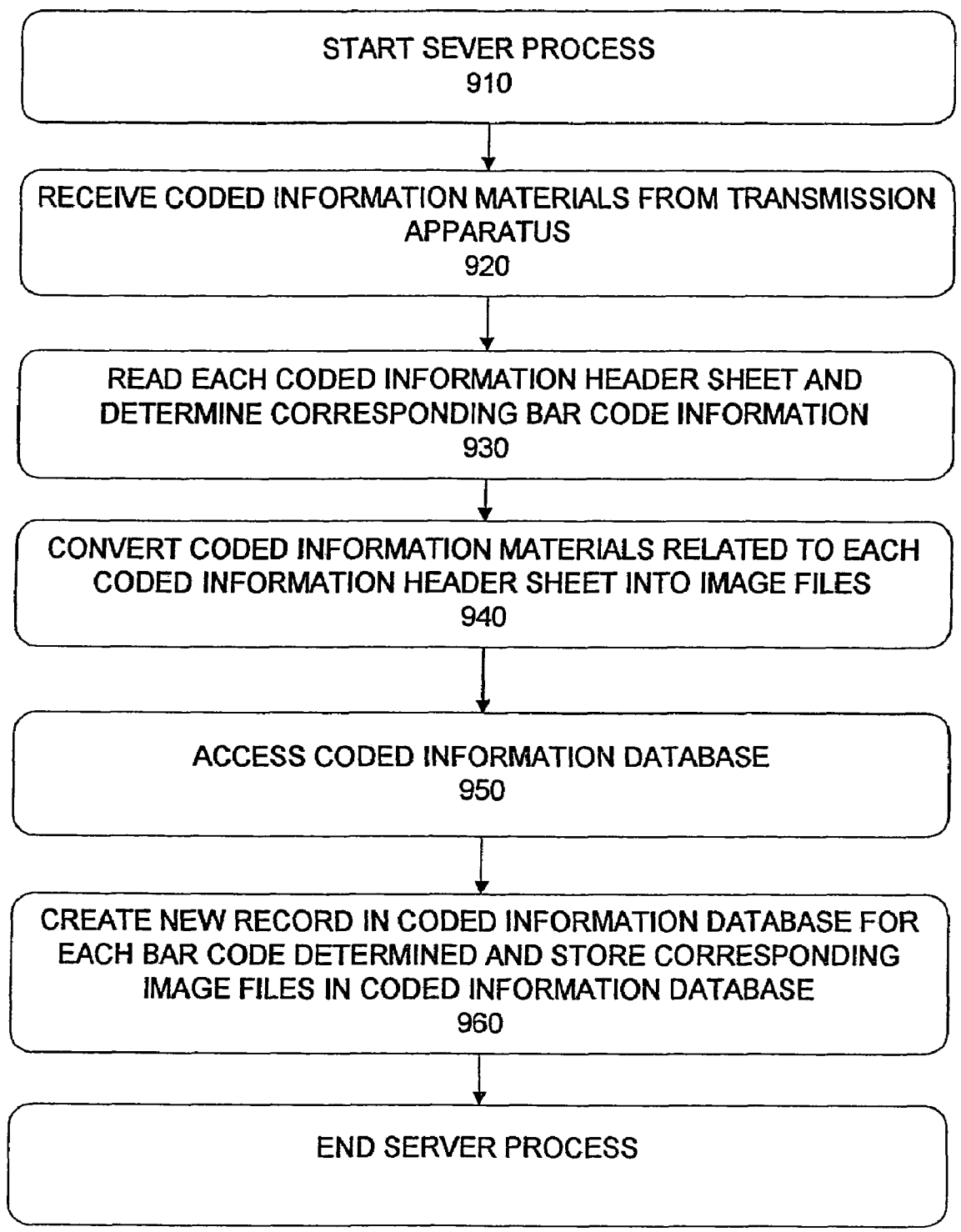
FIG. 9 is a flowchart describing the process by which the processor reads, registers, and stores barcode information and image files of the paper records received from the facsimile apparatus, in accordance with one embodiment of the invention.

FIG. 9 is a flowchart that illustrates the steps that are performed in order for processor 108 to receive, read, and process the code-associated information materials. At step 910, processor 108 initiates the process shown in FIG. 9 by accessing system controller 114. Next, at step 920, processor 108 receives the transmission of code-associated information materials 12 from fax transmission apparatus device 120.

At step 930, barcode reader module 134 of processor 108 reads barcode 21 of code-associated information materials 12. Methods of reading a transmitted barcode are well known in the art and are not described herein.

According to one embodiment of the invention, at step 940, code-associated information materials 12 are processed by encryption module 134 of processor 108. Encryption module 134 processes the code-associated information materials 12 by encrypting the information, thereby generating an encrypted information material. Methods to encrypt electronically transmitted information into encrypted image files are well known in the art and are not described here. Advantageously, the barcode, or portions of it, is employed by the system as a public encryption key, thereby requiring the private key (e.g.—the patient's authentication data) in order to decrypt the information.

Next, at step 950, processor 108 accesses the encrypted information data module 164 of storage means 150. At step 960, processor 108 creates a new record location in encrypted information data module 164 corresponding to the patient's identification number. The new encrypted information material is then stored in the new memory location. Methods of accessing a database by computer and creating a new record in the database for storing encrypted information are well known in the art and therefore are not further described here.

Figure 10A:
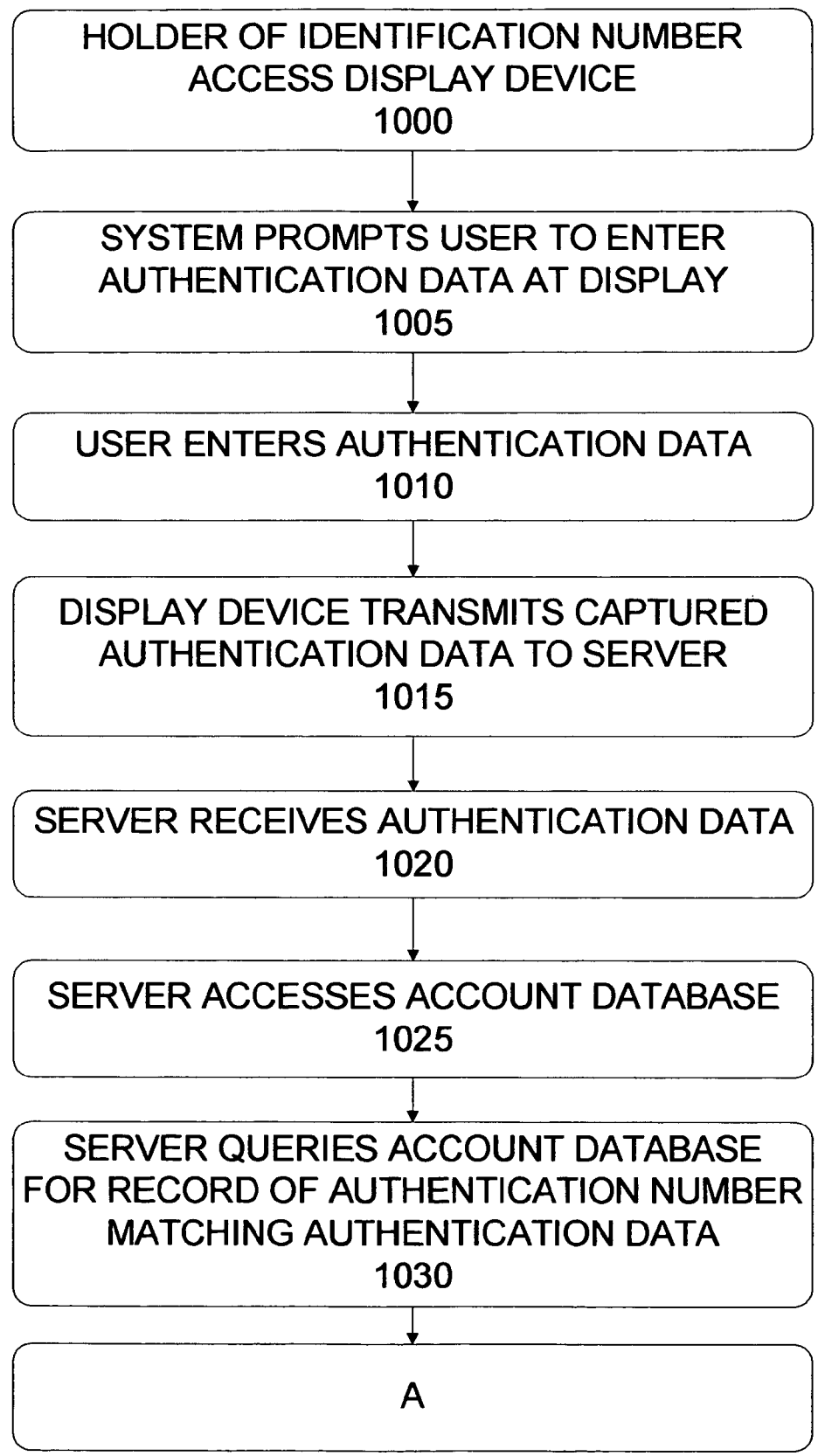
FIG. 10 is a flowchart describing the process by which a person who has previously registered to receive unique identification information and authentication data can view image files of automatically faxed records on the web, in accordance with one embodiment of the invention.
Figure 10B:
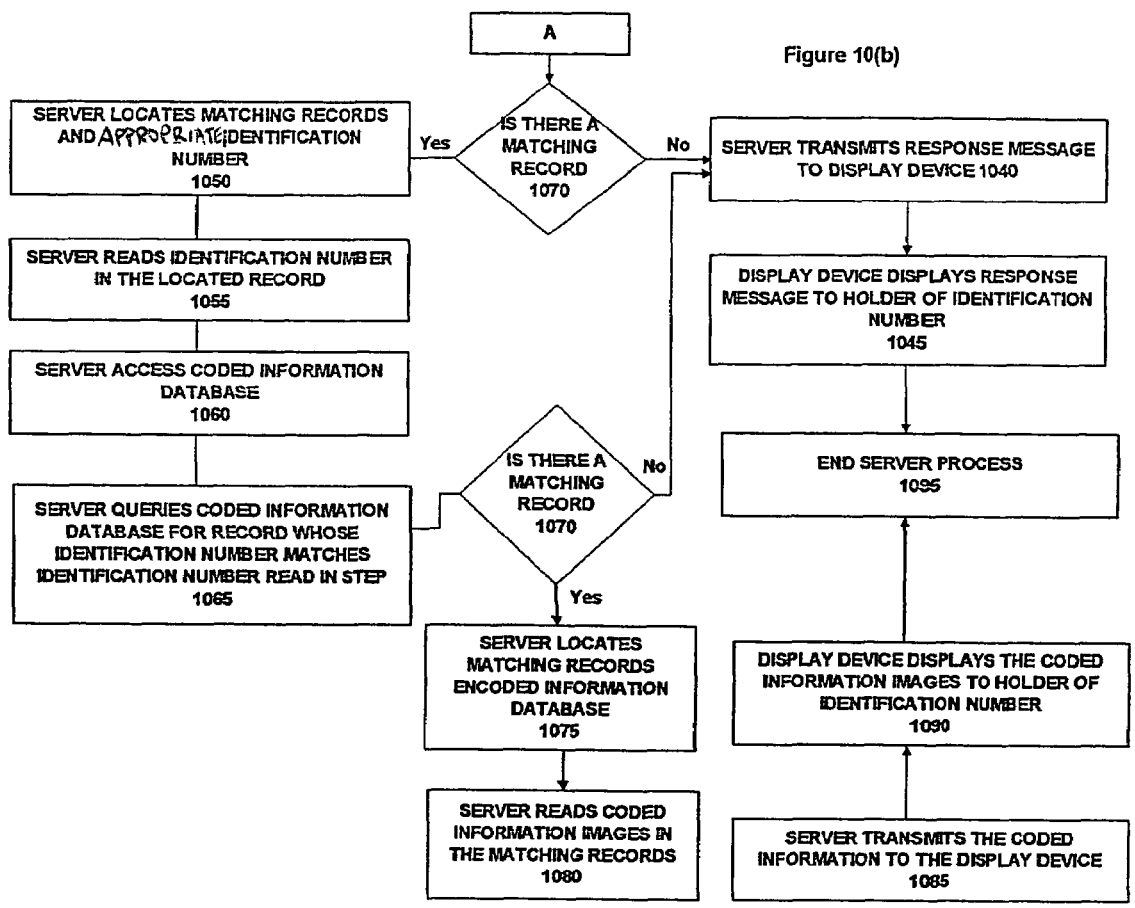

FIG. 10 is a flowchart that illustrates the steps that are performed, according to one embodiment of the invention, in order for a patient (or other user of the system) to retrieve and display a copy of the patient's medical records on a designated web site.

At step 1000, the patient accesses an interaction device 102, such as a computer terminal or the like, and enters his or her identification number. Advantageously, the interaction device is connected to the processor of the present invention via Internet as shown in FIG. 1, and interacts therewith via interfaces provided by viewer graphics interface module 110. Such interaction devices are well known in the art and could include, for example, a computer terminal, an interactive voice response unit, and other means that will permit processor 108 to interact with the person. At step 1005, processor 108 prompts the patient to enter authentication data via the interaction device.

At step 1010, the patient enters his or her authentication data. At step 1015, the interaction device 102 transmits the received authentication data to processor 108 for processing. At step 1020, processor 108 receives the transmitted authentication data. At step 1025, processor 108 accesses patient authentication data module 166 of storage means 150. At step 1030, processor 108 searches patient authentication data module 166 for a record having in authentication data field 166b the authentication data that was entered by the patient in step 1010.

At step 1035, processor 108 determines whether there is a record for which the patient authentication data which was entered by the patient at step 1010 is the same as the authentication data stored in authentication data field 166b. If it is determined at step 1035 that no record has data in field 166b matching the authentication data entered in step 1010, then the system proceeds to step 1040. At step 1040, processor 108 transmits a corresponding response message back to the interaction device 102. At step 1045, the response message is displayed to the patient via the interactive device. For instance, according to one embodiment of the invention, this response message may be "Sorry, your password is not recognized by the system," and it may also include additional information, such as are customary for such response messages displayed on interaction devices. The system then proceeds to step 1095, whereat the process is ended.

If, on the other hand, it is determined at step 1035 that there exists a record in patient authentication data module 166 having authentication data in field 166b which matches the authentication data entered by the patient at step 1010, then the system proceeds to step 1050. At step 1050, processor 108 accesses the record having the matching authentication data. At step 1055, processor 108 reads the identification number contained in the field 166a corresponding to the matching record.

Next, at step 1060, processor 108 accesses the encrypted information data module 164 of storage means 150. At step 1065, processor 108 searches encrypted information data module 164 for a record having the patient's identification number stored in field 164a. At step 1070, processor 108 determines whether encrypted information data module 164 has a record with the patient's identification number stored in field 164a.

If it is determined at step 1070 that there is no record in encrypted information data module 164 that has a matching identification number, then the system proceeds to step 1040. As previously explained, at step 1040, processor 108 transmits a corresponding response message back to the interaction device 102. At step 1045, the response message is displayed to the person via the interactive device. For instance, according to one embodiment of the invention, this response message may be "Sorry, there is no record which have been stored for this account," and it may also include additional information, such as are customary for such response messages displayed on interaction devices. The system then proceeds to step 1095, whereat the process is ended.

If, on the other hand, it is determined at step 1070 that there exists one or more records in encrypted information data module 164 that matches the patient's identification number, then the system proceeds to step 1075. At step 1075, processor 108 accesses the matching record in the encrypted information data module 164. At step 1080, processor 108 reads the record to obtain the corresponding encrypted information material in field 164b. In addition, decryption module 136 of processor 108 decrypts the encrypted information materials.

At step 1085, processor 108 transmits the decrypted information material to the interaction device 102. At step 1090, the information material is displayed to the patient on the interactive device. The system then proceeds to step 1095, whereat the process is ended.

While FIG. 10 illustrates the steps that are performed in order for a patient to access his or her own medical records, the present invention also contemplates that persons other than the patient may be authorized by the patient to view medical records. For instance, according to one embodiment of the invention, the patient provides an access code to an emergency physician. In this embodiment, the patient's access code is stored in access code data module 172 of database 150. When logged on to the web site, an authorized physician may enter the access code of the patient when prompted by processor 108. If processor 108 determines that the access code entered by the user matches an access code in access code field 172b (see an illustration of access code data module in FIG. 6), then the patient's identification number in identification number field 172a is employed to locate corresponding information materials in encrypted information data module 164. These information materials are then decrypted and displayed to the user. Advantageously, according to one embodiment which is explained in more detail below, the use of an access code enables a user to view a patient's information materials on a read-only basis, i.e.— without the ability to modify, edit, delete, etc.

Figure 11:
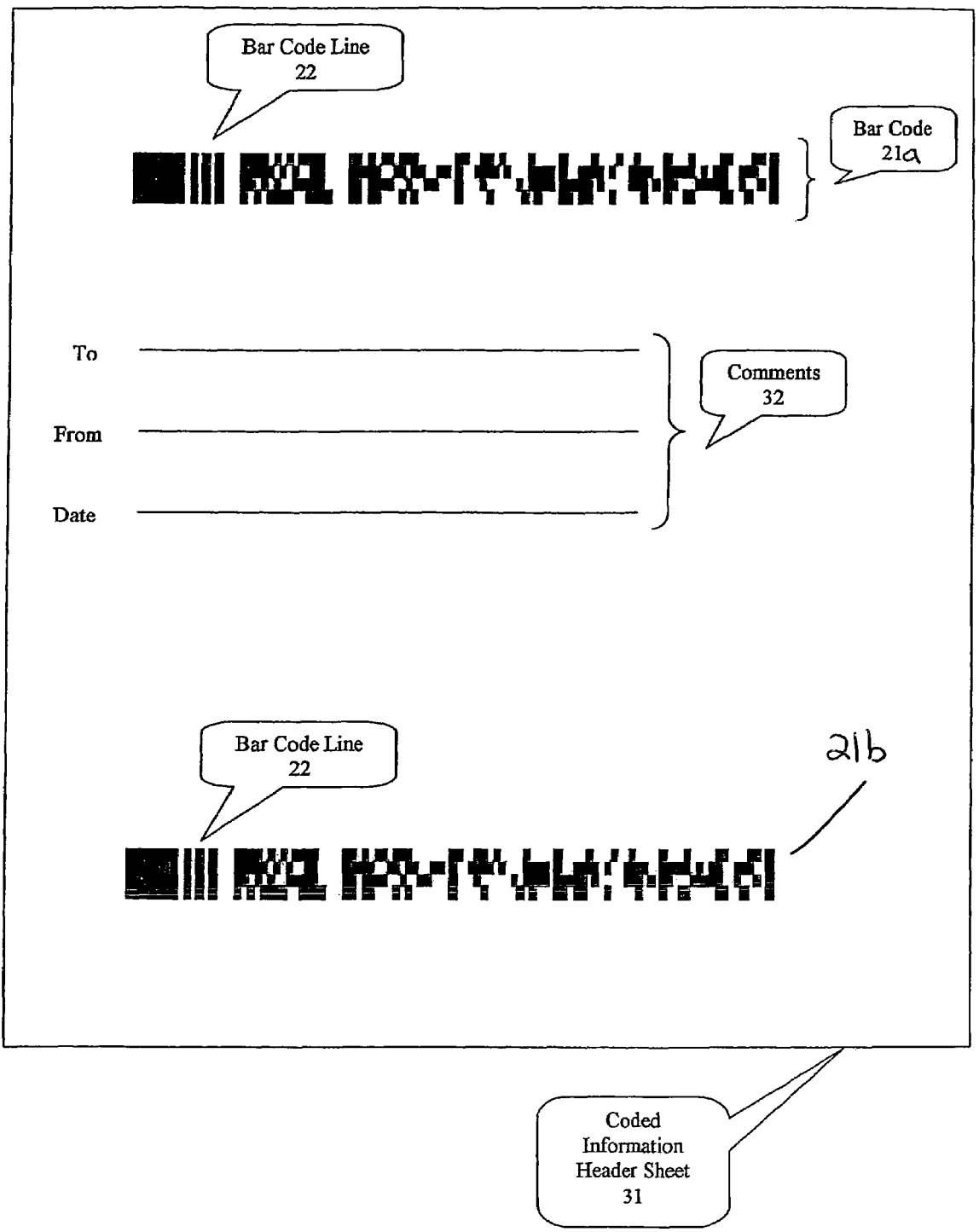
FIG. 11 is an illustration of a fax cover page with more than one printed barcode on the cover page, in accordance with one embodiment of the invention.

Reference is now made to FIG. 11, which as previously mentioned illustrates a fax cover sheet having more than one barcode. According to one embodiment of the invention, first barcode 21a corresponds to a patient's identification number, and is employed to store the medical record in a storage location that corresponds to the patient. Second barcode 21a, on the other hand, may correspond to the medical practitioner that is transmitting the record, and may be employed to also store the medical record in a storage location that corresponds to the medical practitioner.

As previously mentioned, the present invention also contemplates that medical practitioners can employ account manager module 142 of processor 108 in order to access and monitor the records of the patients which he or she has advised to register with the system. For instance, in one embodiment, doctor authentication data module 170 is employed to store passwords of physicians. In this embodiment, account manager module 142 provides an administrative tool which enables a physician, upon entering a physician identification number such as an access code (which is stored in physician identification number field 170a) and entering the corresponding physician authentication data such as a PIN code (which is stored in physician authentication data field 170b), to view the records of their patients. Advantageously, the patient may still select to deny access by a particular physician to his or her medical records (or to physicians on an image file by image file basis) by locking the records, as is described below in connection with FIGS. 15 and 16.

Figure 12:
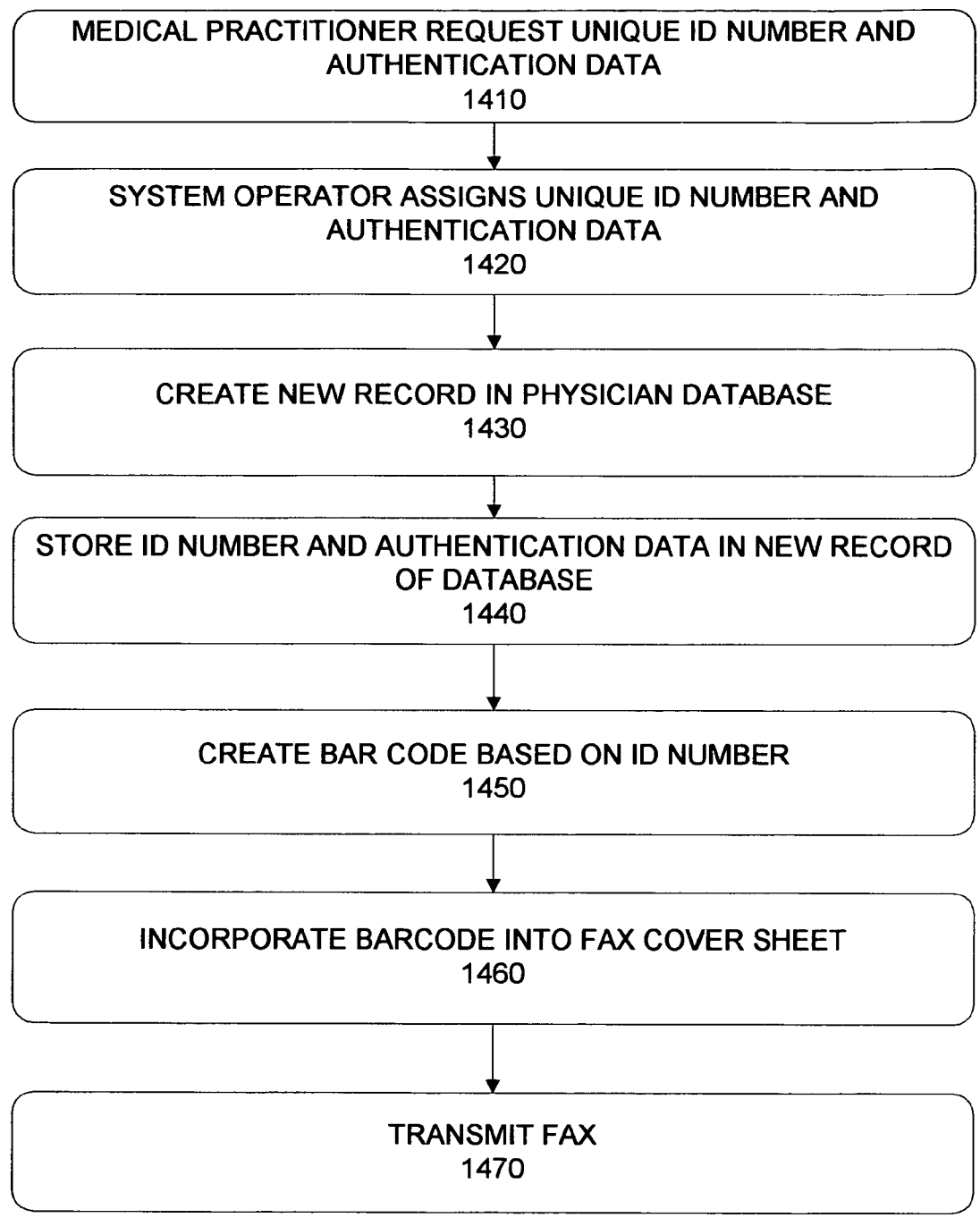
FIG. 12 is a flowchart describing the process by which a medical practitioner can register for and receive a unique identification number and authentication data, in accordance with one embodiment of the invention.

As is discussed below, the flowchart of FIG. 12 illustrates the steps that may be performed in order for a medical practitioner to register with the system in order to receive a medical practitioner barcode for the purpose of maintaining a reimbursement amount or incentive program. The same registration steps may also be employed to generate a barcode so that the medical practitioner may view medical reports that were prepared by him. Thus, a patient's information material is coded and encrypted once according to the patient's barcode, and, according to one embodiment of the invention, is coded and encrypted a second time according to the medical practitioner's barcode.

The present invention also contemplates that second barcode 21b of FIG. 11 (or any other number of barcodes which the system is configured to read) may be employed for other purposes besides automatically routing, encrypting and storing the information materials. For instance, in accordance with one embodiment of the invention, second barcode 21b is employed to identify the type of medical report that is being transmitted. Thus, a medical practitioner may affix to a medical report a barcode corresponding to, for example, a blood test, an MRI or an EKG. In this embodiment, barcode reader module 132 is configured to recognize the barcode and to route and store the medical report as a specific category of information materials.

According to one embodiment and as previously mentioned, the present invention also employs a reimbursement amount or incentive program to insure that medical practitioners, or their staff, transmit the medical records to the processor for storage. In this embodiment, processor 108 comprise reimbursement amount calculation module 138, which is configured to determine a reimbursement amount for medical practitioners, or their staffs, for transmitting the coded information materials to the system for storage therein.

FIG. 12 is a flowchart that illustrates the steps of the reimbursement amount program, in accordance with one embodiment of the invention, in which barcode reader 130 is employed to identify the sender of a transmission. In this embodiment, a medical practitioner registers with the system operator in order to obtain an identification number and authentication data. At step 1410, the medical practitioner contacts the system operator and requests that a unique identification number, and unique authentication data corresponding to the identification number, be assigned to him. Preferably, this step is accomplished by the medical practitioner contacting the system operator directly. Of course, other methods of submission may also take place, for example, by the Internet, electronic mail, telephone, fax, or any other means deemed permissible by the system operator.

At step 1420, the system operator receives the medical practitioner's request and assigns to the medical practitioner a unique identification number, and authentication data that corresponds to the identification number. Next, at step 1430, processor 108 accesses the account database in storage means 150 and generates a new record location in the account database corresponding to the unique identification number and authentication data assigned to the medical practitioner. Methods of accessing a database by computer and creating a new record in the database are well known in the art and therefore are not further described here.

Next, at step 1440, processor 108 saves the identification number and authentication data in the new record location in the account database. Methods of saving information in a database are well known in the art and therefore are not further described here.

At step 1450, barcode generator 130 of processor 108 creates a barcode 21 corresponding to the unique identification number and the unique authentication data assigned to the medical practitioner at step 1420. The barcode may be generated by having processor 108 print barcode 21 on a printer with which it is in communication. The communication between processor 108 and the printer occurs over a connection which is well known in the art and is therefore not described further. Of course, barcode 21 may also be generated in electronic form or various other formats. Advantageously, and as previously mentioned, printed barcode 21 has barcode lines 22 corresponding to the unique identification number and the unique authentication data.

At step 1460, barcode 21 prepared at step 1450 is incorporated into a fax cover sheet which can be transmitted along with the code-associated information header sheet 31 having the barcode of the patient thereon. As previously discussed in connection with the patient's barcode, methods of incorporating barcode 21 include electronically inserting the barcode 21 into an electronic copy of the fax cover sheet, applying adhesive to the back of barcode 21 and pasting it onto the fax cover sheet, as well as any other means that can secure the barcode 21 to the fax cover sheet.

Then, at step 1470, the medical practitioner's fax cover sheet is transmitted to the medical practitioner. Preferably, step 1470 is accomplished by the system operator by contacting the medical practitioner directly. Of course, other methods of transmission may also be employed. For example, the medical practitioner's header sheet may be transmitted to the medical practitioner by the Internet, electronic mail, fax, or any other means acceptable to both the system operator and the patient.

In this manner, when barcode reader module 134 recognizes that a fax has been sent from a particular medical practitioner it communicates to reimbursement amount calculation module 138 to increase the reimbursement amount for that particular medical practitioner. At a predetermined time interval, reimbursement amount calculation module 138 provides the medical practitioner with the appropriate reimbursement amount. In one embodiment, the reimbursement amount is monetary, and the medical practitioner receives a check corresponding to the number of medical reports (or the number of pages) that have been transmitted to the system. Of course, the present invention contemplates that any type of reimbursement amount may be employed.

In another embodiment, reimbursement amount calculation module 138 is configured to recognize the facsimile number from which a code-associated information material has been sent. In this embodiment, the processor employs a simple "caller ID" feature which is well known in the art, in order to determine the fax number from which a faxed transmission has originated. Storage means 150 preferably has a database table which correlates a fax number to a particular medical practitioner, and processor 108 accesses the table in order to determine the medical practitioner that transmits the fax. Reimbursement amount calculator module 138 then tabulates the number of medical records or the number of pages which have been transmitted by the medical practitioner and determines the practitioner's reimbursement amount at a predetermined time interval.

The present invention also contemplates that the reimbursement amount which is calculated by reimbursement amount calculator module 138 is determined based upon the serial number of a form received by fax. For instance, according to one embodiment, forms are provided to medical practitioners for distribution to patients. Each form has printed thereon a serial number or the like. Thus, a group of forms, having consecutive serial numbers, are provided to a medical practitioner. The system stores in database 150 the serial numbers that have been distributed to each medical practitioner. When a form is received by fax, its serial number is ascertained (such as by character recognition technology or by having the serial number included in the barcode) and the system determines which medical practitioner was issued the form bearing said serial number. Once this is determined, reimbursement amount calculation module 138 calculates the reimbursement amount for the appropriate medical practitioner.

According to a preferred embodiment of the invention, the system is configured such that preprinted fax cover sheets, having barcode and user information preprinted thereon, are distributed to medical practitioners. The medical practitioners then distribute the forms to patients that wish to open a new account in the system of the present invention. Advantageously, the user information which is preprinted on the form is covered so that it is only made known to the new patient that uncovers it, as will be explained in greater detail below.

FIG. 13 is a diagram that illustrates a fax cover sheet 200. According to the embodiment of the invention shown, fax cover sheet 200 is divided into regions 205 and 210. Patient information region 205 comprises a barcode 225, and is configured to be appended to a patient's medical record for fax transmission to the system, as previously explained in connection with coded information header sheet 31 of FIG. 3. Region 205 also comprises spaces for a patient to enter credit card information. This credit card information will be employed by the system in order to bill the patient for registering, in accordance with one embodiment.

Fax cover sheet 200 also comprises patient access information region 210. Access information regions 210 is preferably separable from form 200, such as by peeling off. In this embodiment, patient access information region 210 includes a patient identification number or name 235, a patient authentication data such as a password 240, and an access code 245.

According to one embodiment, patient access information region 210 is intended to be separated from form 200 so that the patient can carry the information preprinted thereon and leave the form with the medical practitioner for safekeeping and future use. The user number/name and access code enable the patient, when logged on the website of the system, to view medical records that have been faxed for storage. The patient password 240, which is known only to the patient, enables the patient, when logged on the website of the system, to modify or edit data corresponding to the records that have been faxed for storage, to determine the accessibility of the record to third parties, etc.

A medical practitioner can access the patient's medical records if the patient consents. In order to consent, the patient fills in space 206 with access data 245. The user number and access code enable the doctor, when logged on the website of the system, to view medical records for the patient that have been faxed for storage, provided that the patient has authorized access. The patient password 240 is not printed on the form (only on the region which the patient keeps for herself), so that the doctor is not able to modify or edit data corresponding to the records that have been faxed for storage, to access records which the patient has locked, etc.

In a preferred embodiment and as previously mentioned, fax cover sheet 200 is configured such that the patient and doctor access information regions 215 and 220 is covered or obscured until used by a patient. For instance, regions 215 and 220 may be covered with a scratch-off material 230 which covers the information, similar to a lottery ticket or the like. When a doctor provides the form to a patient that wishes to register in the system, the patient scratches off the covering of regions 215 and 220 in order to expose the information underneath. In this manner, the patient's password and access codes remain confidential until the form is used. Of course, the present invention contemplates that any method known for covering or obscuring the information is within the scope of the invention.

Figure 14:
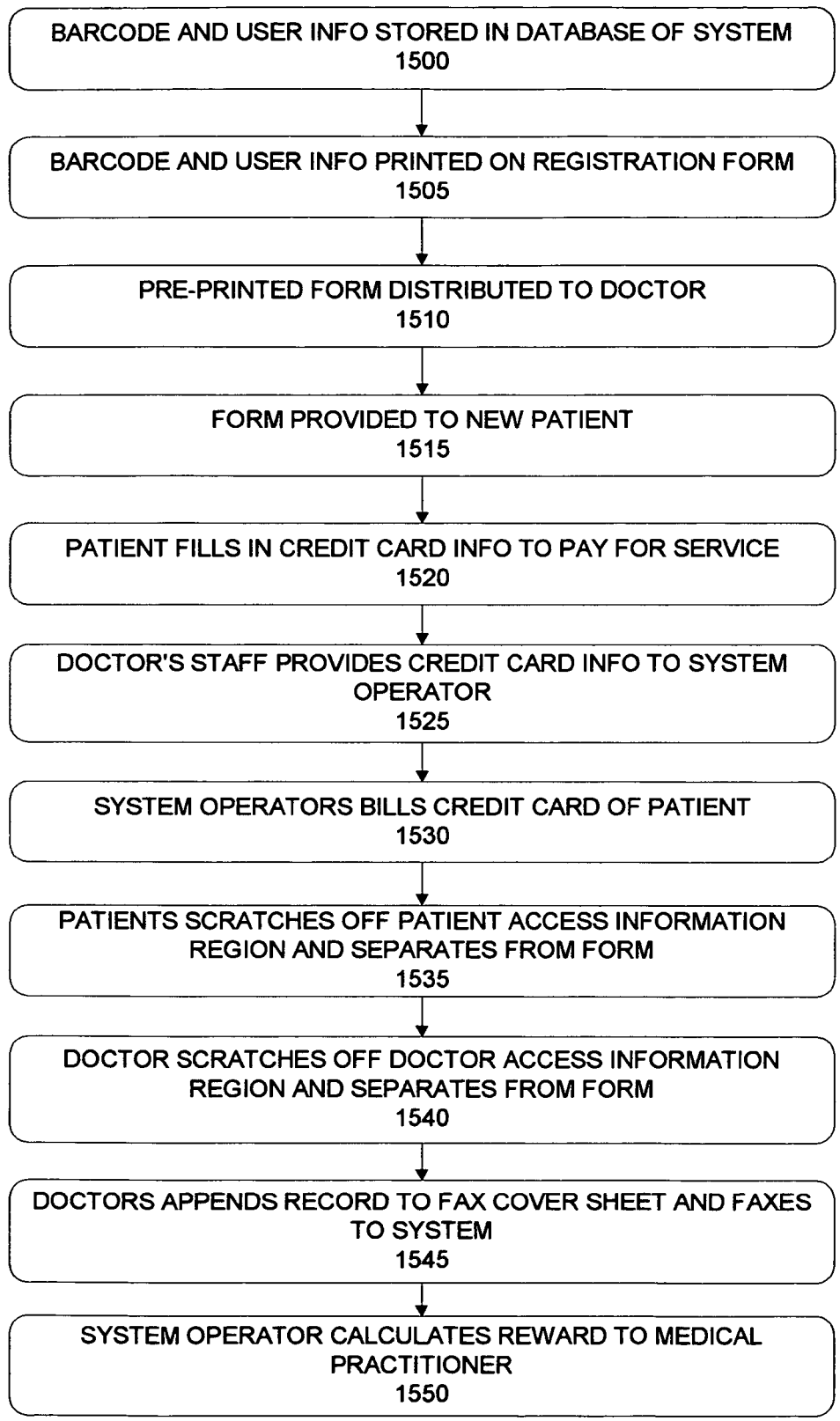
FIG. 14 is a flowchart that illustrates the steps performed in order to employ a preprinted fax cover sheet, in accordance with one embodiment of the invention.

FIG. 14 is a flow chart that illustrates the steps that are employed, according to one embodiment of the invention, to use a fax cover sheet such as form 200 of FIG. 13. At step 1500, barcode and user information (such as user ID number 235, user password 240 and access code 245 shown in FIG. 13) is stored in the system. In this embodiment, barcode generator 130 is employed to generate barcodes which are incorporated into the preprinted registration forms. In addition, the record locations in storage means 150 corresponding to each of these barcodes are stored in the system when the preprinted forms are generated. Therefore, this embodiment differs from the previously described system in which the corresponding record locations are not generated in storage means 150 until a cover sheet bearing the barcode is faxed to processor 108.

At step 1505, the barcode and user information is printed on a form, such as fax cover sheet 200 of FIG. 13. At step 1510, the preprinted form is distributed to a medical practitioner, who is given the task of advising patients to register in the system.

At step 1515, preprinted form 200 is provided to a patient that desires to register in the system. At step 1520, the patient fills in his or her credit card information in payment information region 210. In this embodiment, the patient pays a nominal fee for registering in the system, although it is contemplated that other systems within the intended scope of the present invention may not require a patient to pay a registration fee, but may instead require a medical practitioner to pay for registration, or have no registration fees at all.

At step 1525, the medical practitioner provides the credit card information filled in by the patient in step 1520 to the system of the present invention. At step 1530, the system bills the credit card of the patient. In one embodiment, processor 108 employs character recognition technology in order to read the credit card data which has been provided by the patient. In addition, the system may be configured to process a patient's medical records while the system confirms payment.

At step 1535, the patient separates patient access information region 215 of access information region 210 from form 200. In addition, the patient scratches off scratch-off region 230 in order to expose user ID number 235, user password 240 and access code 245. Similarly, at step 1540, doctor access information region 220 of access information region 210 is separated from form 200, either by the patient or by the medical practitioner. In addition, the medical practitioner scratches off scratch-off region 230 in order to expose user ID number 235 and access code 245.

At step 1545, the medical practitioner appends cover sheet region 205 of patient registration form 200 to a medical record and faxes both to the predetermined facsimile number associated with the system, where the record is stored as previously discussed. Once the medical record is stored in the system, either the patient or the medical practitioner may access the record using the user ID name/number or, in the case of the patient, the password. In a preferred embodiment, the code-associated medical record which is faxed has a barcode which comprises a barcode region such as region 22a previously described in connection with FIG. 2(b). In this manner, barcode region 22a is employed to identify the incoming fax as a fax cover sheet, such as form 200 shown in FIG. 13, or a summary medical record, as shown in FIG. 17.

At step 1550, according to one embodiment of the invention, the system calculates a reimbursement amount to the medical practitioner. Preferably, reimbursement amount calculation module 138 is employed to tabulate the number of patients that a particular medical practitioner successively advises to register in the system, although any conceivable reimbursement scheme is contemplated.

Figure 15:
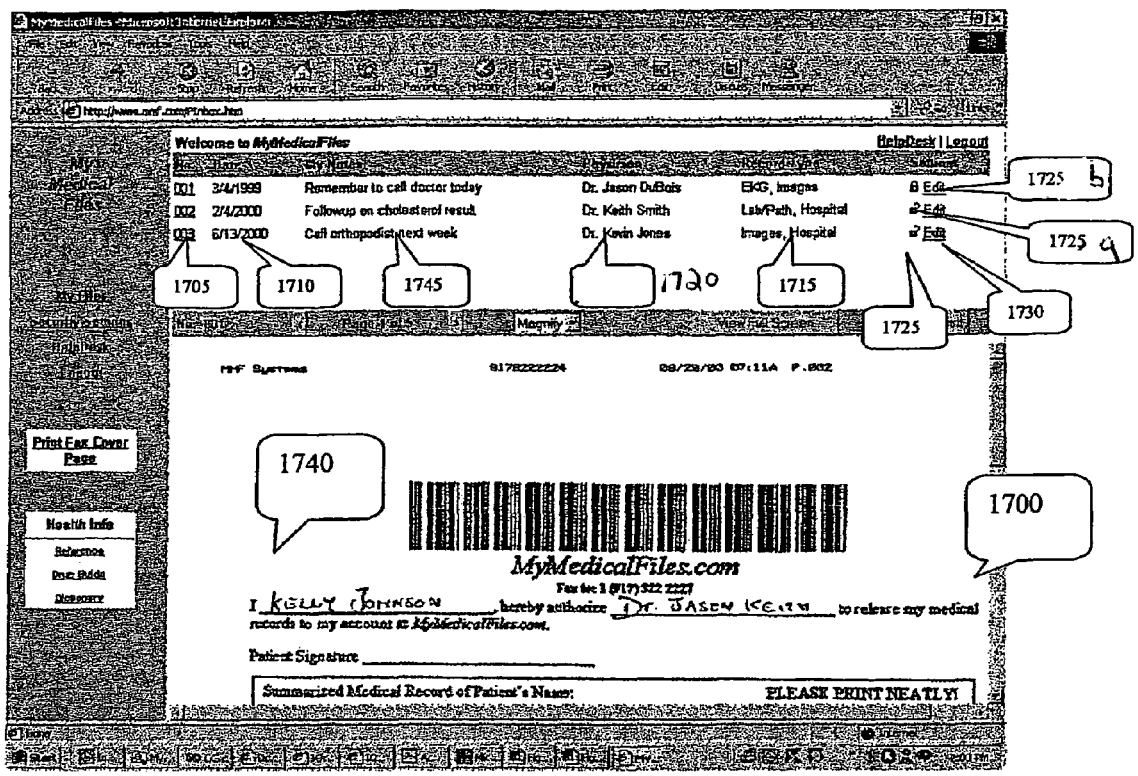
FIG. 15 is an interface that may be employed in order to display a list of medical records that may be accessed by a user, in accordance with one embodiment of the invention.

FIG. 15 illustrates an interface 1700 which is employed, according to one embodiment of the invention, to display a list of the records which have been stored in the system for a particular patient. Interface 1700 includes medical record number field 1705, which simply provides a number for each medical record. Medical record date field 1710 displays the date upon which a particular medical record was faxed into the system. Medical record type field 1715 displays the type of medical record (e.g.—an EKG, a medical summary, etc.), while medical practitioner field 1720 displays the doctor which prepared the medical record and transmitted it to the system, and notes field 1745 displays the patient's notes regarding a particular medical record.

Access status field 1725 displays whether the medical record is accessible to other users of the system. For instance, access status field 1725a shows an unlocked medical record, wherein access to the medical record is provided to a user of the system (more specifically, a user such as a doctor who has logged onto the system by using the correct authentication code corresponding to the patient's identification number or name). By contrast, access status field 1725b shows a locked medical record, such that other users of the system do not have access to the medical record.

Interface 1700 also shows edit record function field 1730, which enables a patient to edit a particular medical record. Of course, the edit function is only available to a patient, not to a medical practitioner, thereby insuring that a patient's medical records are not tampered with. Finally, the medical record, displayed as a GIF image, corresponding to the record selected by the user, is displayed in medical record image field 1740.

Figure 16:
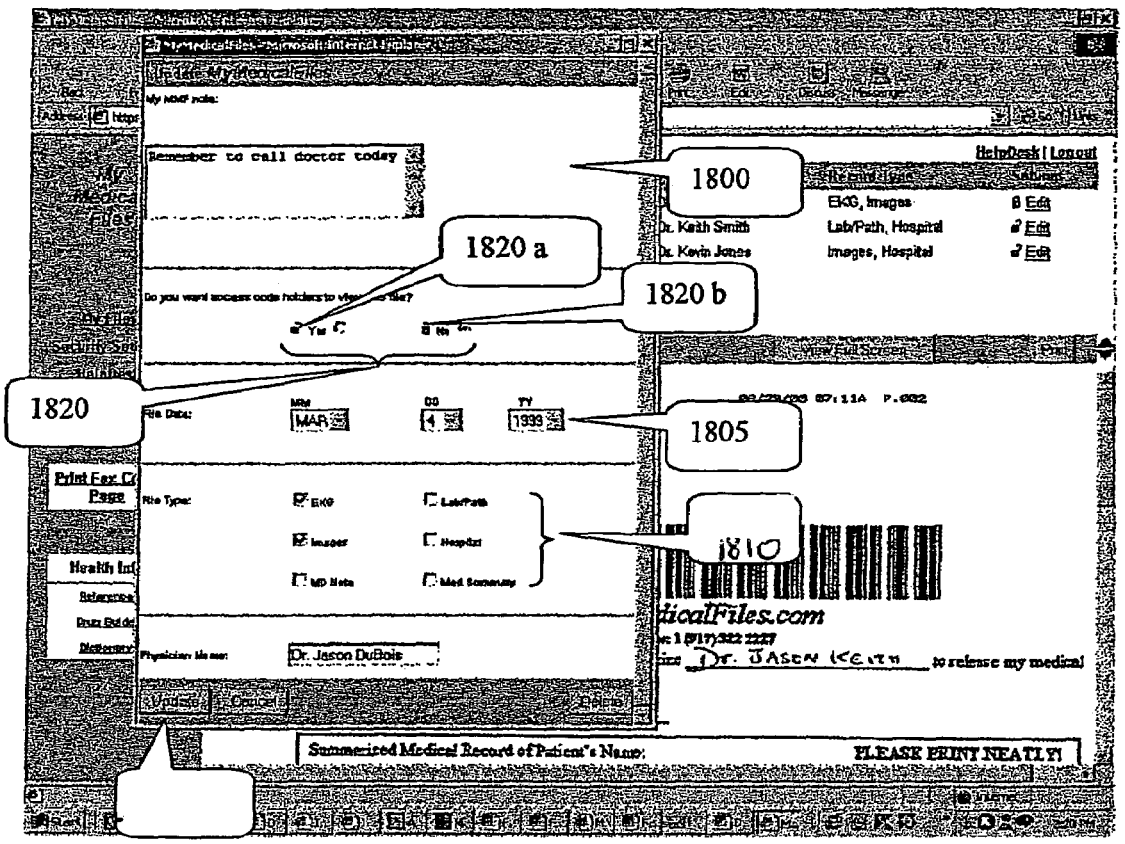
FIG. 16 is an interface that may be employed by a patient in order to edit a medical record and to restrict access to the record by other users, in accordance with one embodiment of the invention.

FIG. 16 illustrates an interface that may be employed, according to one embodiment of the invention, in order to enable a patient to edit a medical record. For instance, interface 1800 may be displayed to a patient when the patient clicks on edit record function field 1730 of interface 1700. Edit date function field 1805 enables a patient to edit the date associated with a medical record, such as medical record date field 1705 of interface 1700. Edit type function field 1810 enables a patient to edit the type of medical record, such as medical record type field 1715 of interface 1700. Edit physician name function field 1815 enables a patient to edit the physician's name, such as medical practitioner field 1720 of interface 1700.

Finally, edit access field 1820 enables a patient to restrict the access of another person, such as a physician, to the medical record. Thus, if a patient selects "access unlocked" field 1820a, other authorized users of the system (e.g.—doctors using the patient's access code) are permitted access to the medical record, and an unlocked symbol, such as the symbol shown in field 1725a, is displayed in interface 1700. If, however, the patient selects "access locked" field 1820b, other authorized users of the system are prevented from accessing the medical record, and a locked symbol, such as the symbol shown in field 1725b, is displayed in interface 1700.

In one embodiment, a patient may select, for each record in the system, the doctors that may access the record. In this way, the patient may provide medical records to their physicians on a "need to know" basis. In another embodiment, the system is configured such that the patient must select to provide to medical practitioners either complete access to all of the patient's medical records or no access to any of the records. In this case, the patient is provided with an interface that lists all of the patient's doctors, along with a locking feature.

As explained above, the medical records of a patient are kept confidential when the patient locks the records from being accessed by an authorized person. In order to further protect the confidentiality of a patient's records, the present invention also employs audit log module 140 of processor 108. Audit log module is configured to maintain a record whenever a physician or other authorized user of the system accesses a patient's medical records.

Specifically, audit log module 140 is activated when a user, such as a physician, accesses the medical records of a patient. A record of each access, such as the date and time of the access and the identity of the person that accessed the record, is recorded in audit log data module 168 of database 150. This auditing procedure deters doctors that obtain a patient's access code, but who do not treat the patient or have not been given permission by the patient to access their records, from viewing the patient's medical records.

As previously discussed, the present invention contemplates that patient registration form 200 will be employed to register new patients in the system. In one embodiment, billing information is provided by the patient in region 210 of form 200, and the amount billed to the patient's credit card is divided between the system operator and the physician that registered the patient. In order to insure that full and accurate medical records are provided by the physician for the patient, one embodiment of the present invention provides a payment to the physician when the physician completes and faxes a summary medical record. In another embodiment, medical practitioners may elect to waive their portion of the payment, thereby lowering the cost of registration in the system to patients.

FIG. 17 illustrates a sample summary medical record 300 that may be employed for this purpose. Summary medical record 300 comprises barcode 21 as previously discussed. In addition, summary medical record 300 also comprises doctor notation section 310, in which the physician describes the patient's health, including problems, medical and surgical histories, immunizations, medications, etc. Advantageously, a physician completes a summary medical record for each patient approximately once per year. Thus, each patient re-registers on an annual basis, insuring up to date information is stored in the patient's medical records and enabling both the system operator and the physician to benefit from an annual re-registration fee.

In addition, summary medical record 300 may comprise a barcode region 21. In a preferred embodiment, barcode 21 corresponds to a serial number which is assigned to each summary medical record. Barcode 21 is read by barcode reader 132 of processor 108 when the record is faxed to the system. Advantageously, each summary medical record 300 is faxed with a patient's fax cover sheet 200, so that the record can be routed and stored in a storage location corresponding to the patient. Alignment guides 305 may be employed by barcode reader 132 in order to insure that it is reading the barcode 21 correctly.

In this embodiment, summary medical records 300 are preprinted with serialized numbers. Each has a barcode 21 corresponding to the record's serial number. The summary medical record forms 300 are distributed to medical practitioners in blocks having consecutive serial numbers. For example, a first medical practitioner may receive forms having serial numbers 100 to 199, a second medical practitioner may receive forms having serial numbers 200-299, etc. Reimbursement calculation module 138, or a similar data module, stores data indicating which serial numbers have been distributed to which medical practitioners.

One of the advantages of the above-described embodiment is that, by employing serialized summary medical record forms 300, the inventory of summary medical record forms 300 that is required to be maintained is drastically reduced. For instance, any block of serialized forms may be provided to a medical practitioner, since the forms are not physician-specific. A system that employs physician-specific summary medical record forms (such as a system in which employs physician barcodes, as previously mentioned) requires that an inventory of forms be maintained for each medical practitioner. The above-described embodiment, on the other hand, requires a single inventory of forms that can be distributed to any medical practitioner.

The present invention also contemplates that the system is configured to enable medical practitioners to print summary medical records 300 on a printer located in the medical practitioner's office whenever the medical practitioner runs out of her current supply. For instance, in one embodiment, a medical practitioner may contact processor 108 with a request for additional forms, and processor 108 is configured to assign a block of serial numbers to that medical practitioner. Processor 108 then generates barcodes 21 corresponding to these serial numbers, and transmits them to the medical practitioner, who incorporates the barcodes into new forms. This may be accomplished in any number of ways, such as by e-mailing the forms having the new barcodes printed therein to the medical practitioner for printing, or by faxing the forms to the medical practitioner. It is also contemplated that each medical practitioner maintain at her terminal software which generates the barcodes in response to processor 108 providing the new serial numbers, and which prints new forms (or stickers to be affixed to blank forms) when desired. Of course, any means by which new forms having serialized barcodes may be generated is contemplated by the present invention.

Figure 20:
FIG. 20 is an illustration of a re-usable fax cover sheet, in accordance with another embodiment of the invention.

The present invention also contemplates that a patient may print out forms when needed. For instance, FIG. 20 illustrates a re-usable fax cover page 400 that a patient may provide to physicians in order that those physicians fax in medical records pertaining to the patient. Advantageously, re-usable fax cover page 400 is employed when the patient wishes to have medical records faxed into the system by a different physician than the one that advised him to register in the system. Barcode 21 is preferably the same barcode that was assigned to the patient as previously described. Account information region 405 may be filled out by the patient if the patient desires that the physician have access to other records that have been stored in the system for the patient. The form may be requested by a patient on-line, by telephone or fax, or any other way which the system is configured to support.

With respect to the manner in which users may communicate with processor 108, the present invention is preferably configured such that it employs "fax-back" and/or integrated voice response ("IVR") functionality so that the features of the invention which have previously been described may also be employed by persons that do not have access to the Internet. For instance, in one embodiment, a user may communicate with processor 108 by telephone 124 via PSTN 122 to perform a variety of functions, such as to register in the system, change access or authentication information, receive copies of stored medical records, etc. This embodiment employs a voice server module 144 of processor 108. Voice server module 144 is configured to answer a telephone call, ask pre-recorded questions and to collect information. Voice server module 144 advantageously employs logic which queries the user for information and performs predetermined operations in response to the information entered by the caller.

In this embodiment, processor 108 is configured to provide a menu of caller selections, which the caller may respond to by either pressing buttons on the telephone or by speaking. Thus, in the first instance, processor 108 is configured to receive the signals transmitted when the user presses a button and to perform predetermined functions based on the signals received. In the second instance, processor 108 employs speech recognition technology in order to process the responses that are spoken by the caller, and then performs predetermined functions based on the responses provided.

By way of example, processor 108 may receive a telephone call from a user via PSTN 122. Processor 108 asks the caller whether the caller wants to receive a document by fax (i.e.— the fax back feature), or to perform doctor options or patient options. If the caller selects the fax back feature, the caller enters or speaks her user name and authentication data such as a PIN code, and then, in response to a menu of selections, specifies the document that the caller wishes to receive. The document may be a form, a previously-stored medical record, etc. Processor 108 then employs fax server module 146 to generate a fax to a fax number provided by the caller. The fax is then delivered to the caller to fax device 120 via PSTN 122.

If the caller is a medical practitioner and selects the doctor options, processor 108 provides to the caller during the call a menu of selections such as to receive information about registration, to register as a physician in the system, etc. The caller then enters or speaks her name, address, phone number, etc. for the purpose of facilitating the request. If the caller is a patient and selects the patient options, processor 108 provides to the caller during the call a menu of selections such as to receive information about registration, to register as a patient in the system, to change her authentication data or contact information, to renew a membership, etc. The caller then enters or speaks the required information in order to perform the requested function.

FIG. 18 is a sample interface that may be employed by account manager module 142 of processor 108 in order to enable medical practitioners to keep track of the patients that they have advised to register in the system. FIG. 18 shows interface 1900. Preferably, interface 1900 is displayed to a medical practitioner after the medical practitioner enters his or her physician identification number and password. Interface 1900 may be displayed on a computer terminal, or else may be displayed on a personal data assistant ("PDA") or other hand-held device. In this way, medical practitioners do not need to remain at a stationary terminal, but can instead examine patient's information as they move through their facility from patient to patient. As previously explained, a physician's identification number and password are stored in doctor authentication data module 170, and are provided to the medical practitioner upon registering with the system.

Interface 1900 shows one way in which data corresponding to the medical practitioner's patients may be displayed. For instance, interface 1900 shows patient number field 1905, which provides a listing of the patients. Patient name field 1910 comprises the name of each patient, while patient identification number field 1915 displays each patient's corresponding identification number. Access code filed 1920 displays each patient's access code, while field 1925 display other information which the medical practitioner may deem relevant.

Figure 19:
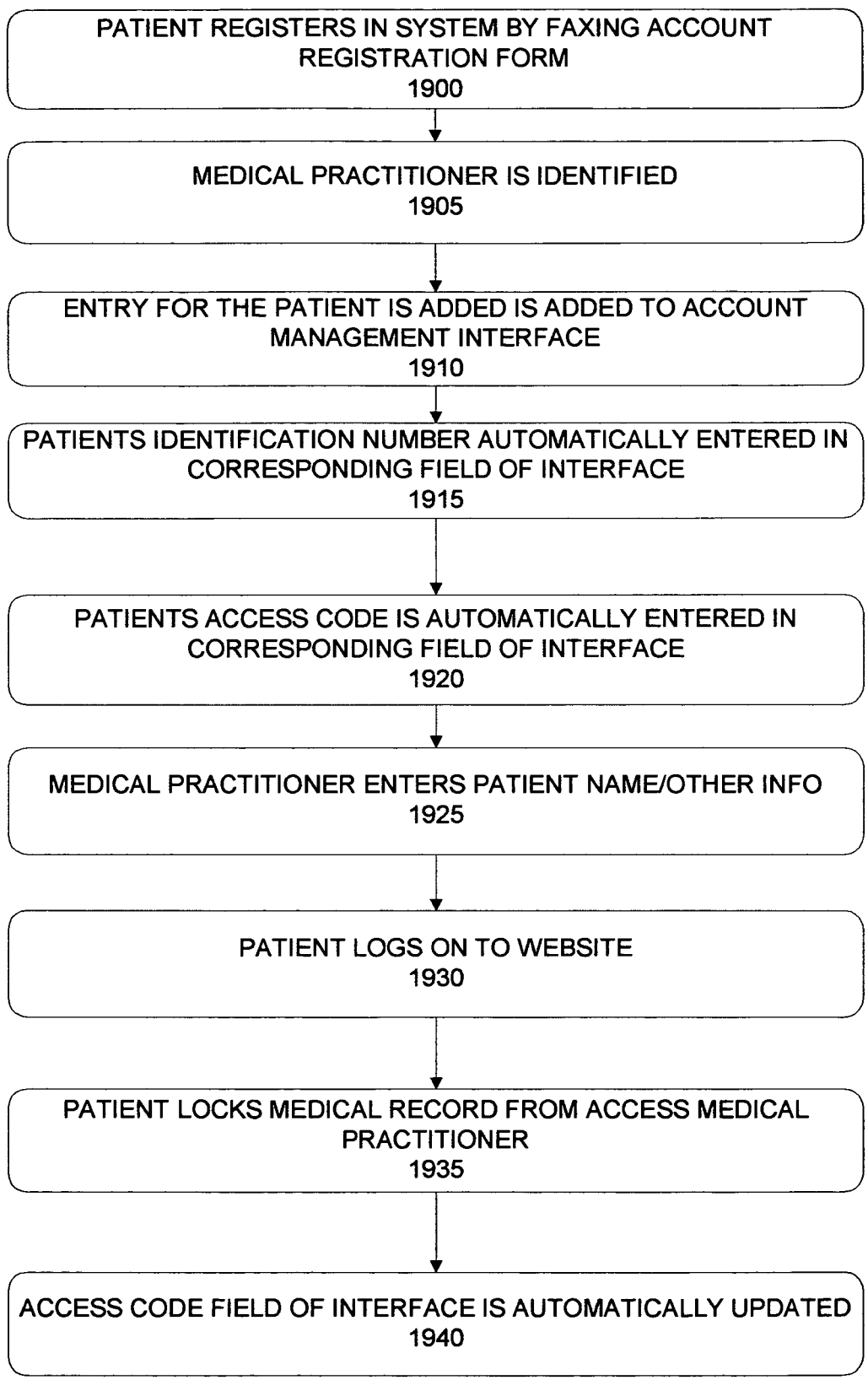
FIG. 19 is a flowchart describing the process by which the account management interfaces are automatically updated, in accordance with one embodiment of the invention.

Preferably, processor 108 is configured such that entries in interface 1900 are made automatically when a medical practitioner registers a patient in the system. For instance, FIG. 19 is a flowchart that illustrates the steps that are performed in order to automatically update the data shown in account manager interface 1900. At step 1900, a patient registers with the system by faxing in preprinted registration form 200 to processor 108. At step 1905, the medical practitioner that advised the patient to register is identified. As previously discussed, the medical practitioner may be identified based upon the fax number that the form is transmitted from, by a physician's barcode which is appended to the form, or preferably, by reading the serial number of the form.

At step 1910, processor 108 adds an entry to account manager module 142 for the medical practitioner identified in step 1905. At step 1915, the patient's identification number is automatically stored in patient identification number field 1915 of the new entry. At step 1920, the patient's access code is automatically stored in access code field 1920 of the new entry. At step 1925, the medical practitioner may enter additional information in the entry, such as the patient's name in field 1910 and other relevant information in field 1925.

Subsequently, at step 1930, a patient may log onto the website of the present invention. At step 1935, the patient determines that she does not wish the medical practitioner to have access to her medical records. The patient may lock the medical record as previously explained in connection with FIG. 16. At step 1940, access code field 1920 for the entry corresponding to the patient is automatically updated to state "Access Denied." Thus, a medical practitioner is cognizant of which patient's records are accessible and which patient's records are not accessible.

It should be understood that certain modifications of the present invention discussed herein will be obvious to those skilled in the art. All such modifications are deemed to be within the scope and spirit of the present invention as defined by the appended claims.

We claim:

1. A method comprising the steps of:

receiving a transmissions from a plurality of health care providers via a facsimile device, said transmission including a facsimile image of a document containing medical information relating to a patient of a health care provider, along with a separate facsimile form having a first coded information thereon, said first coded information being used to associate said document with an account relating to said patient, said separate facsimile form further having a second coded health care provider identifier, said second coded health care provider identifier identifying a health care provider submitting said document containing medical information, said facsimile device transmitting said transmission to a processor via a public-switched telephone network;

receiving at said processor a plurality of said transmissions from said plurality of health care providers, each of said transmission, including said documents containing medical records relating to a plurality of said patients and each of said transmissions including said separate facsimile form, sent from said plurality of health care providers, wherein each set of said documents is received along with said separate facsimile form;

automatically storing at said processor said images of said transmissions in a memory location relating to one of said patient account associated with said first coded information on said separate facsimile form and further associating said images of said transmissions with said second coded health care provider identifier; and providing at least one image from said images of said transmissions from said account associated with said first coded information to an authorized user at a user designated device in response to a request received.

2. The method according to claim 1, wherein said separate facsimile form further comprises a third coded information identifying a particular type of medical information being received.

3. The method according to claim 2, wherein said coded information is a barcode.

4. The method according to claim 2, wherein said third coded information identifies a form of medical information selected from the group consisting of blood test, radiology and EKG.

5. The method as claimed in claim 1, wherein said step of receiving said transmission from said account associated with said first coded information includes providing said patient an access information for accessing document containing medical information.

6. The method as claimed in claim 1 further comprising the steps of:

receiving documents containing medical information from two or more health care providers, among said plurality of health care providers, each having separate coded health care provider identifiers;

storing said received documents containing medical information in association with said first coded information; and allowing said one or more health care providers to subsequently review only said documents containing medical information stored in association with said second coded information.

7. The method as claimed in claim 6 further comprising the steps of:
allowing said patient to alter access rights to said documents containing medical information stored in association with said first coded information: and
allowing a first health care provider having a corresponding first coded health care provider identifier to review documents containing medical information stored in association with said first coded information that are associated with a second health care provider having a corresponding second coded health care provider identifier.

\* \* \* \* \*